(12) United States Patent
Tamaki et al.

(10) Patent No.: US 8,731,129 B2
(45) Date of Patent: May 20, 2014

(54) CASK BUFFER BODY

(75) Inventors: Hiroki Tamaki, Hyogo (JP); Yuichi Saito, Hyogo (JP); Kiminobu Hojo, Hyogo (JP); Tadashi Kimura, Hyogo (JP); Hiroshi Shimizu, Hyogo (JP); Akio Kitada, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 1198 days.

(21) Appl. No.: 10/569,226

(22) PCT Filed: Aug. 10, 2005

(86) PCT No.: PCT/JP2005/014657
§ 371 (c)(1),
(2), (4) Date: Nov. 13, 2006

(87) PCT Pub. No.: WO2006/016606
PCT Pub. Date: Feb. 16, 2006

(65) Prior Publication Data
US 2007/0108086 A1   May 17, 2007

(30) Foreign Application Priority Data

Aug. 10, 2004  (JP) ................................ 2004-233695

(51) Int. Cl.
*G21C 19/00* (2006.01)

(52) U.S. Cl.
USPC .................... 376/272; 188/377; 206/591

(58) Field of Classification Search
USPC .......... 188/377, 371, 376; 206/521, 586, 588, 206/591, 592; 376/272
See application file for complete search history.

(56) References Cited

U.S. PATENT DOCUMENTS

| | | | | | |
|---|---|---|---|---|---|
| 2,093,341 | A | * | 9/1937 | Reiche | .......................... 446/104 |
| 2,493,435 | A | * | 1/1950 | Arehambault | ................ 446/122 |
| 2,506,188 | A | * | 5/1950 | Alviset | .......................... 251/359 |
| 2,567,857 | A | * | 9/1951 | Proctor | ...................... 242/118.4 |
| 2,922,559 | A | * | 1/1960 | Gilfix et al. | .................... 206/521 |
| 3,500,996 | A | * | 3/1970 | Gorman | ........................ 206/583 |
| 3,886,368 | A | * | 5/1975 | Rollins et al. | .............. 250/507.1 |

(Continued)

FOREIGN PATENT DOCUMENTS

| | | |
|---|---|---|
| JP | 61-40368 | 3/1986 |
| JP | 61-40369 | 3/1986 |

(Continued)

OTHER PUBLICATIONS

International Search Report of International Application PCT/JP2005/014657 mailed on Nov. 22, 2005.

*Primary Examiner* — Thomas Irvin
(74) *Attorney, Agent, or Firm* — Westerman, Hattori, Daniels & Adrian, LLP

(57) ABSTRACT

A first shock absorber group is obtained by combining a plurality of shock absorber blocks, absorbs a shock in a direction parallel to an end surface of a cask, consisting of a first material. A second shock absorber group absorbs the shock in a direction perpendicular to or oblique with respect to the end surface, consisting of a second material having a weaker compressive strength than the first material. A third shock absorber group absorbs the shock in a direction perpendicular to the end surface, consisting of a third material having a weaker compressive strength than the second material. A space is provided at least in the first shock absorber group.

2 Claims, 35 Drawing Sheets

(56) References Cited

U.S. PATENT DOCUMENTS

| | | | |
|---|---|---|---|
| 4,058,188 A * | 11/1977 | Vrillon | 188/377 |
| 4,116,337 A * | 9/1978 | Backus | 206/591 |
| 4,190,160 A * | 2/1980 | Andersen et al. | 206/591 |
| 4,241,810 A * | 12/1980 | Newlon | 188/376 |
| 4,423,802 A * | 1/1984 | Botzem et al. | 188/377 |
| 4,602,908 A * | 7/1986 | Kroeber | 446/128 |
| 4,815,605 A * | 3/1989 | Brissier et al. | 206/523 |
| D343,427 S * | 1/1994 | Sher | D21/499 |
| D352,077 S * | 11/1994 | Sher | D21/505 |
| 6,234,311 B1 | 5/2001 | Francois | |
| 6,308,810 B1 * | 10/2001 | Kuwayama | 188/379 |
| 6,550,754 B2 * | 4/2003 | Kuwayama | 267/141.5 |
| 6,778,625 B2 * | 8/2004 | Ohsono et al. | 376/272 |
| 6,839,395 B2 * | 1/2005 | Ohsono et al. | 376/272 |
| 6,878,952 B1 * | 4/2005 | Ohsono et al. | 250/506.1 |
| 6,898,258 B2 * | 5/2005 | Ohsono et al. | 376/272 |
| 7,194,060 B2 * | 3/2007 | Ohsono et al. | 376/272 |
| 7,215,728 B2 * | 5/2007 | Ohsono et al. | 376/272 |
| 7,327,821 B2 * | 2/2008 | Ishihara et al. | 376/272 |
| 2005/0157833 A1 * | 7/2005 | Ishihara et al. | 376/272 |
| 2005/0224729 A1 * | 10/2005 | Tamaki | 250/507.1 |
| 2007/0138041 A1 * | 6/2007 | Welsh | 206/349 |
| 2013/0068578 A1 * | 3/2013 | Saito et al. | 188/377 |

FOREIGN PATENT DOCUMENTS

| | | |
|---|---|---|
| JP | 10-230973 | 9/1998 |
| JP | 2001-83291 | 3/2001 |
| JP | 2002-211649 | 7/2002 |
| JP | 2003-315493 | 11/2003 |
| JP | 2004-309235 | 4/2004 |
| JP | 2005-49177 | 2/2005 |

* cited by examiner

A-A

B-B

C-C

E-E

E-E

CASK BUFFER BODY

TECHNICAL FIELD

The present invention relates to a buffer body attached to a cask.

BACKGROUND ART

A spent nuclear fuel assembly having burnt at the end of a nuclear fuel cycle is referred to as "recycle fuel". Since the recycle fuel contains highly radioactive materials such as FPs and needs to be thermally cooled, it is cooled in a cooling pit in a nuclear power plant for a predetermined period of time. The cooled recycle fuel is then contained in a cask, which is a shielding container, and the cask is transported and stored in reprocessing facilities or intermediate storage facilities by truck, ship or the like.

If the cask is transported to the reprocessing or intermediate storage facilities, the recycle fuel containing highly radioactive materials is contained in the cask. Therefore, the cask should be kept shielded and hermetically sealed as much as possible unless it is unnecessary to do so. To do so, during transport of the cask, the cask is protected by covering both ends of a cask main body with cask buffer bodies. By doing so, even if the cask falls, for example, the cask is kept shielded and hermetically sealed. As an example of the cask buffer body of this type, Patent Document 1 discloses a cask buffer body having an interior filled with a wood material.

Patent Document 1: Japanese Patent Application Laid-open No. 2003-315493.

DISCLOSURE OF INVENTION

Problem to be Solved by the Invention

The cask buffer body disclosed in the Patent Document 1 uses the wood material as a shock absorber that absorbs a shock energy by crashing the wood material. Since the wood material is a natural material and a fiber assembly, reproducibility of a crash behavior of the wood material is poor and it is difficult for the wood material to exhibit a stable shock absorbing performance. The present invention has been achieved to solve the conventional problems. It is an object of the present invention to provide a cask buffer body capable of exhibiting a stable shock absorbing performance.

Means to Solve the Problems

To solve the above problems and to achieve the goal, a cask buffer body according to one aspect of the present invention includes a shock absorber configured to be attached to a cask that stores a recycle fuel. The shock absorber absorbs a shock against the cask by being deformed, and includes a space for adjusting a shock absorbing capability.

In this cask buffer body, the space for adjusting the shock absorbing characteristic is provided in the shock absorber that constitutes the buffer body, and the shock absorbing characteristic of the shock absorber is adjusted. It is thereby possible for the shock absorber to include the shock absorbing characteristic and to exhibit a stable shock absorbing performance. The shock absorbing characteristic is a shock energy absorbing characteristic relative to a compression amount of the shock absorber.

According to the present invention, the space is a hole formed in each of the shock absorber blocks. By doing so, shearing, cracking, and crashing can be generated in the shock absorber with this hole set as a point of origin, and absorption of the shock energy by the shock absorber can be accelerated. Furthermore, since the space can reduce a rigidity of an entire shock absorber, lockup of the shock absorber, i.e., a sudden rise of a reaction force of the shock absorber can be delayed.

According to the present invention, a cross-sectional shape of the hole includes an angular portion. The cross-sectional shape of the hole refers to a shape within a cross section orthogonal to a formation direction of this hole.

According to the present invention, a dimension of the hole is changed toward a direction in which the shock is input to the shock absorber.

Accordingly, right after the shock is input to the shock absorber, it is possible to promptly crash the shock absorber, and sufficiently absorb a shock energy. In addition, by making it more difficult to crash the shock absorber as crashing progresses, a motion of the cask can be effectively stopped.

According to the present invention, the space is a wedge notch, and the wedge notch is formed at least on a side of the shock absorber on which the shock is input to the shock absorber.

As seen in a cask buffer body according to the next invention, the space can be a notch formed in the shock absorber block.

According to the present invention, the shock absorber is formed by combining a plurality of shock absorber blocks made of a wood material.

The shock absorber constituting this buffer body is constituted by combining a plurality of shock absorber blocks each consisting of the wood material. In addition, a space is provided in each of these shock absorber blocks so as to adjust the shock absorbing characteristic of the shock absorber. By doing so, even if the shock absorber consists of the material, or particularly the wood material, to which an excessive initial stress occurs at the moment of shock or the crash behavior of which has poor reproducibility, the shock absorber can include the shock absorbing characteristic and exhibit a stable shock absorbing performance.

According to the present invention, the shock absorber is formed by combining a plurality of shock absorber blocks made of a wood material, in an annular shape, and the shock absorber blocks are integrated by winding a block binding unit around a circumferential groove formed on an outer circumference of the shock absorber in the annular shape.

By thus constraining the shock absorber blocks constituting the cask buffer body, the respective shock absorber blocks can be firmly fixed by a tensile force of the block binding unit. In addition, shearing, cracking, and crashing can be generated in the shock absorber blocks with grooves set as points of origin, and absorption of the shock energy by the shock absorber blocks can be accelerated.

According to the present invention, the shock absorber is formed by combining a plurality of shock absorber blocks made of a wood material, in an annular shape. Each of the shock absorber bocks includes a shock absorber block A having a diametral outside dimension smaller than a diametral inside dimension; and a shock absorber block B having a diametral outside dimension larger than a diametral inside dimension. A compressive strength of the shock absorber block A is stronger than a compressive strength of the shock absorber block B.

By thus making the shock absorber block A, which consists of a material (e.g., oak) having a high compressive strength, have the diametral outside larger in area than the diametral inside, a reaction force within the shock absorber block A gradually rises if a shock load is applied to the block A. The shock absorber block B can suppress a motion of the shock absorber block A toward a circumferential direction of the shock absorber. As a result, a peak load that tends to occur in an initial period of the shock can be suppressed to be low and the shock load can be absorbed by a predetermined crash margin.

According to the present invention, the space is provided in such a manner that the space divides or passes through fibers of the wood material constituting each of the shock absorber blocks.

Since the space that divides or penetrates a formation direction of fibers that has a great influence on the crash characteristic of the wood material is thus provided, it is possible to make the shock absorbing characteristics uniform and exhibit a stable shock absorbing performance.

According to the present invention, the space is provided substantially in parallel to fibers of the wood materials constituting each of the shock absorber blocks.

By thus providing the space in parallel to the fiber direction of the wood material, crashing of the shock absorbing block can be generated more easily in response to the compressive load. The shock load can be thereby absorbed more easily if the shock load acts as the compressive load.

According to the present invention, the space is a hole formed in each of the shock absorber blocks. By doing so, shearing, cracking, and crashing can be generated in the shock absorber with this hole set as a point of origin, and absorption of the shock energy by the shock absorber can be accelerated.

According to the present invention, a cross-sectional shape of the hole includes an angular portion.

By generating shearing, cracking, and crashing in the shock absorber consisting of the wood material with the angular portion included in the hole set as a point of origin, this cask buffer body can accelerate absorption of the shock energy by the shock absorber.

According to the present invention, the angular portion is formed on a side of the shock absorber on which the shock is input to the shock absorber.

Since the angular portion is thus formed on the side of the shock absorber on which the shock is input to the shock absorber, it is possible to effectively generate shearing, cracking, and crashing in the shock absorber consisting of the wood material with this angular portion set as a point of origin, and accelerate absorption of the shock energy by the shock absorber.

According to the present invention, the space is a wedge notch, and the wedge notch is formed at least on a side of the shock absorber on which the shock is input to the shock absorber, in such a manner that a top of the wedge notch is oriented to a direction in which the shock is input to the shock absorber.

By thus forming the top of the notch to be oriented toward the direction in which the shock is input to the shock absorber, it is possible to effectively generate shearing, cracking, and crashing in the shock absorber consisting of the wood material with the top of this notch set as a point of origin, and accelerate absorption of the shock energy by the shock absorber.

According to the present invention, the space is a notch formed toward a direction in which the shock is input to the shock absorber.

This notch can reduce an apparent cross-sectional area of the shock absorber and reduce an initial peak load when the shock acts on the shock absorber.

According to the present invention, the space is a notch formed perpendicular to a fiber direction of the wood material.

Since this notch can reduce the rigidity of the entire shock absorber, lockup of the shock absorber, that is, a sudden increase of the reaction force within the shock absorber can be delayed.

According to the present invention, the shock absorber includes a first shock absorber group that is obtained by combining the shock absorber blocks in such a manner that a fiber direction of the wood material is parallel to a shock input direction, that absorbs the shock in a direction parallel to an end surface of the cask, and that consists of a first material; a second shock absorber group that absorbs the shock in a direction perpendicular to or oblique with respect to the end surface of the cask, and that consists of a second material of which a compressive strength is weaker than a compressive strength of the first material; and a third shock absorber group that absorbs the shock in a direction perpendicular to the end surface of the cask, and that consists of a third material of which a compressive strength is weaker than a compressive strength of the second material. The space is provided at least in the first shock absorber group.

In this cask buffer body, the hole, the notch or the other space is provided in the first shock absorber group consisting of the first material (wood material) having the highest compressive strength. It is thereby possible to adjust the shock absorbing characteristic of the first shock absorber group and stably exhibit the shock absorbing performance.

Effect of the Invention

The cask buffer body according to the present invention can stably exhibit the shock absorbing performance.

EXPLANATIONS OF LETTERS OR NUMERALS

Figure 1:
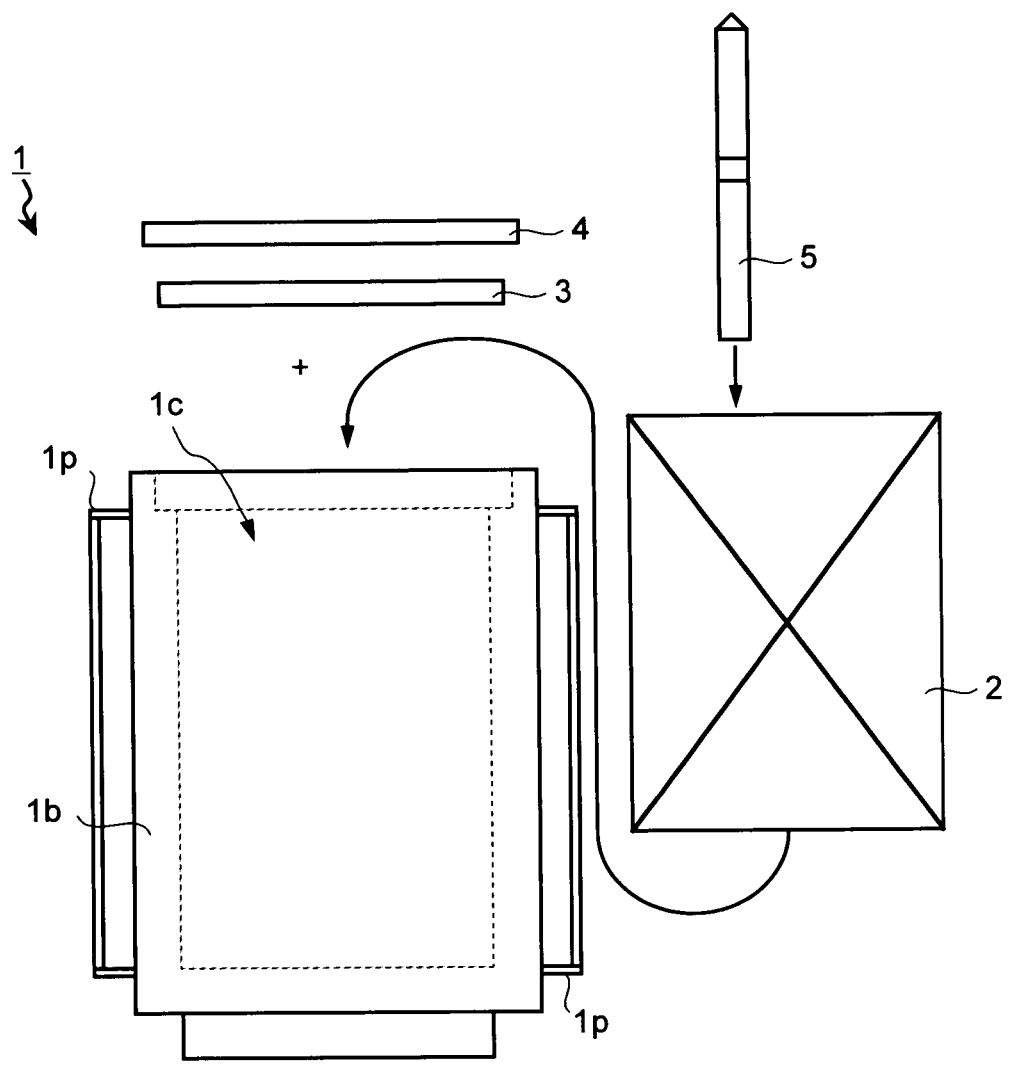
FIG. 1 is an explanatory view of a configuration of a cask according to a first embodiment.

1 Cask
1t End
1tp End surface
1b Barrel main body
4tp Secondary lid end surface (Occasionally, third lid end surface)
6w Outer plate
6 Buffer body
6o Opening
7 Attachment hole
10p Veneer
$10h_1$ Plate material
10s Plate piece
10, 10a, 10b, 10c, 10d, 10e, 10f, 10g, 10h, 10i, 10j, 10k, 10k', 10l, 10m, 10n, 10o, 10p, 10q, 10r, 10s($10s_1$, $10s_2$), 10t, 10x, 10y, 10z, 10A, 10B First shock absorber block
11 Second shock absorber block
12 Third shock absorber block
13 Fourth shock absorber block
14 Fifth shock absorber block
15 Sixth shock absorber block
16 Seventh shock absorber block
17 Eighth shock absorber block
20, 22, 23 Hole
21 Bottomed hole
24 Angular hole
25 Notch
26 Groove
27 Slot
B1 First shock absorber
B2 Second shock absorber
B3 Third shock absorber
B4 Fourth shock absorber
B5 Fifth shock absorber
B6 Sixth shock absorber
B7 Seventh shock absorber
B8 Eighth shock absorber

BEST MODE(S) FOR CARRYING OUT THE INVENTION

The present invention will be explained below with reference to the accompanying drawings. This invention is not limited by best modes for carrying out the invention. Furthermore, constituent elements in embodiments described below include elements easily ascertained by those skilled in the art, or substantially the same elements. The present invention is suitable particularly for a case of using a wood material as a shock absorber of a cask buffer body. However, the invention is not limited to the case. For example, the present invention is also applicable to a case of using a metal material, FRP or the like for the shock absorber of the cask buffer body. The present invention is applicable even to a case that a fiber direction of the wood material that constitutes a second shock absorber assembly is parallel to or orthogonal to an oblique falling direction of the cask.

First Embodiment

FIG. 1 is an explanatory view of a configuration of a cask according to a first embodiment of the present invention. A cask 1 is employed to contain a recycle fuel inside, and transported and stored. A space called "cavity" 1c is formed inside a barrel main body 1b of the cask 1 and a basket 2 is stored in the cavity 1c. The basket 2 is constituted by, for example, bundling square pipe steels each having square cross-sectional internal and external shapes and includes a plurality of lattice cells. A recycle fuel assembly 5 is stored in each lattice cell of the basket 2.

The barrel main body 1b is a forged part consisting of carbon steel that exhibits a gamma ray shielding function. Alternatively, stainless steel can be employed instead of the carbon steel. After storing the basket 2 in which the recycle fuel assembly 5 is contained, in the cavity 1c, a primary lid 3 and a secondary lid 4 are attached to an opening of the barrel main body 1b, thereby hermetically sealing the cavity 1c. At this time, gaskets are provided between the barrel main body 1b and the primary lid 3 and between the barrel main body 1b and the secondary lid 4, respectively, so as to ensure a hermetically sealing performance. Furthermore, a ternary lid is often attached to the opening depending on the type of the cask.

Figure 2A:
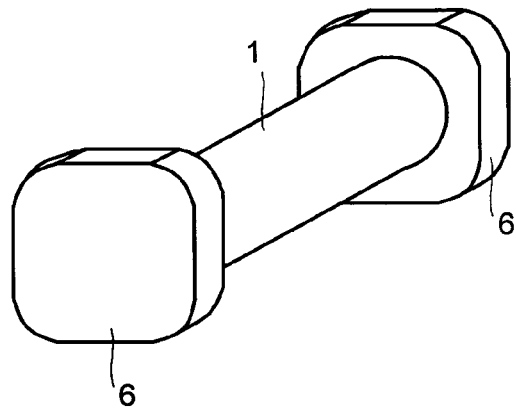
FIG. 2A is a perspective view of a form of a cask during transport.
Figure 2B:
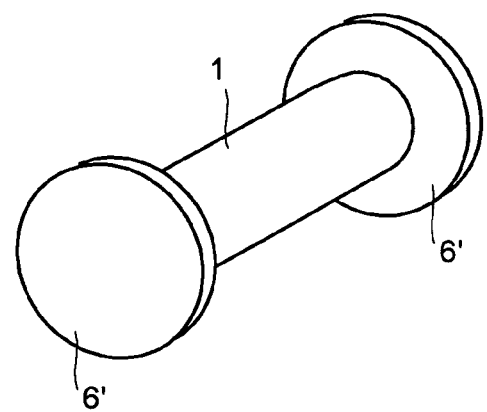
FIG. 2B is a perspective view of a form of the cask during transport.
Figure 3:
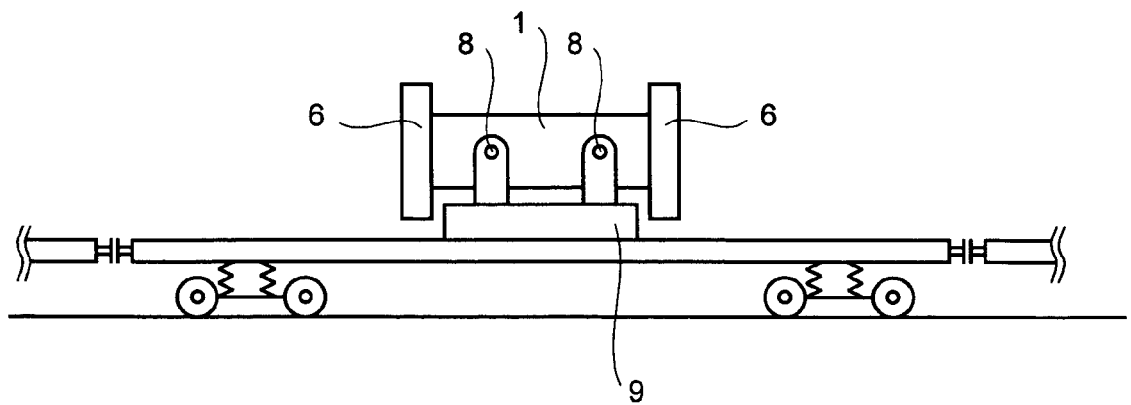
FIG. 3 is an explanatory view of an example of transporting the cask by train.

FIGS. 2A and 2B are perspective views of a form of the cask during transport. FIG. 3 is an explanatory view of an example of transporting the cask by train. As shown in FIGS. 2A and 2B, at the time of transporting the cask 1, cask buffer bodies (hereinafter, "buffer bodies") 6 are attached to both ends of the cask 1, respectively, so as to prevent possible falling, collision or the like during the transport. If the cask 1 is transported by train, the cask 1 having the buffer bodies 6 attached to the respective ends thereof is mounted on a transport stand 9 and installed in a dedicated freight car. The cask 1 is transported with trunnions 8 provided at the cask 1 fixed to the transport stand 9. As the buffer bodies 6, buffer bodies having each square corner formed into a circular arc as shown in FIG. 2A are used. Alternatively, as shown in FIG. 2B, circular buffer bodies 6' are used. Furthermore, buffer bodies of various shapes can be used according to specifications of the cask 1.

Figure 4A:
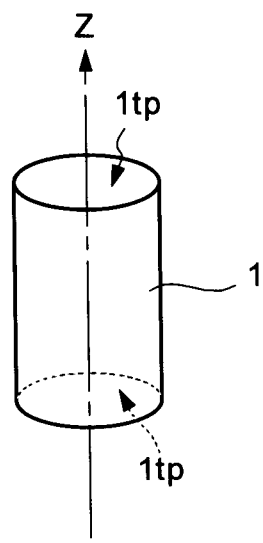
FIG. 4A is an explanatory view of definition of a central axis of the cask.
Figure 4B:
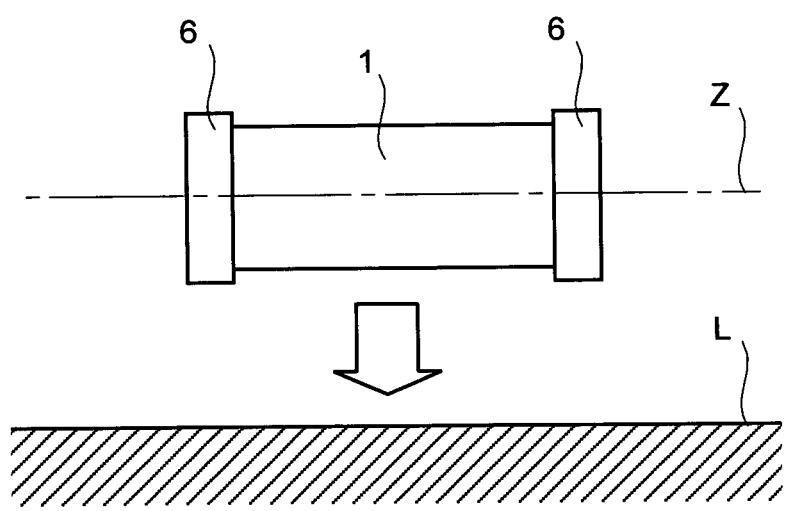
FIG. 4B is an explanatory view of a form of falling or collision of the cask.
Figure 4C:
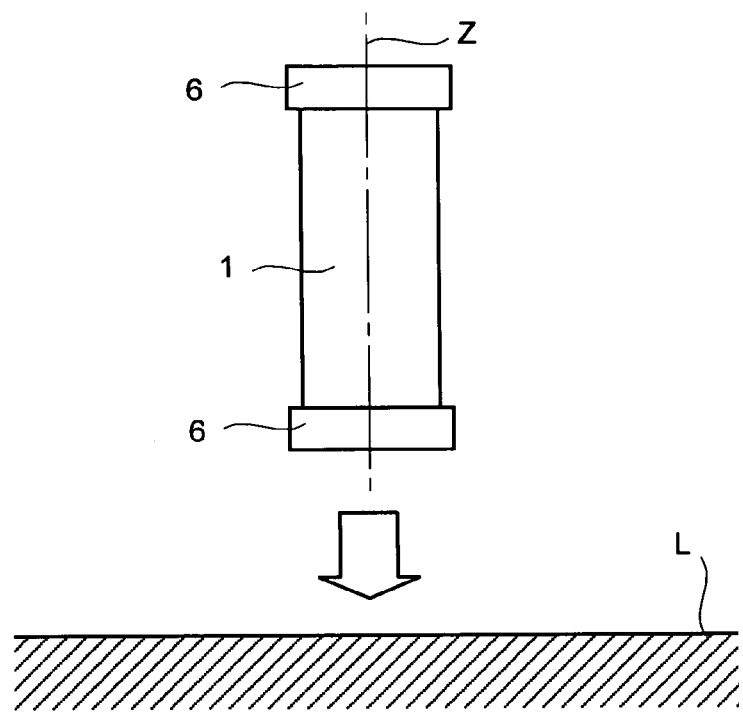
FIG. 4C is an explanatory view of a form of falling or collision of the cask.
Figure 4D:
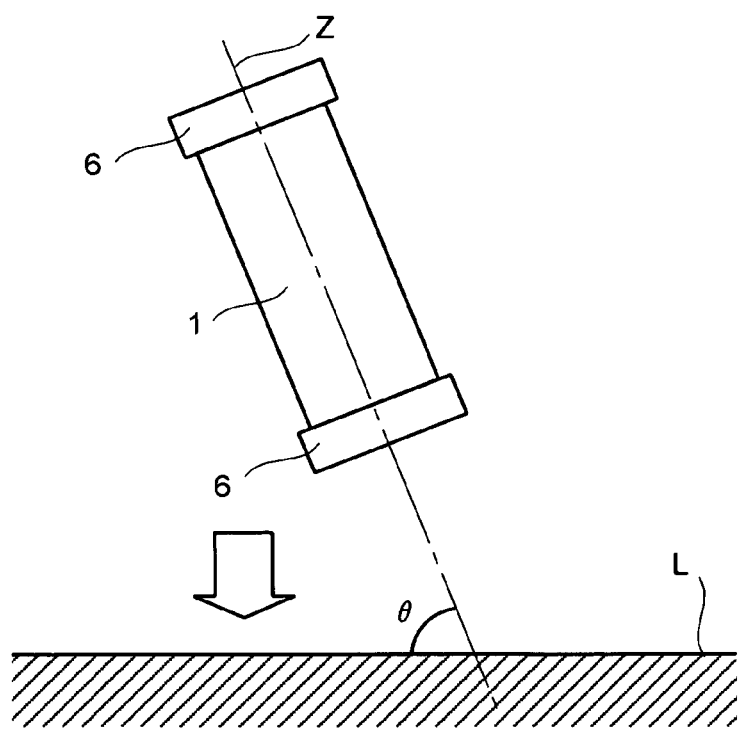
FIG. 4D is an explanatory view of a form of falling or collision of the cask.

FIG. 4A is an explanatory view of definition of a central axis of the cask. In the first embodiment, the central axis Z of the cask 1 is parallel to a longitudinal direction of the cask 1 (that is, a longitudinal direction of the recycle fuel in a state where the fuel is stored in the cask 1), and orthogonal to an end surface 1tp of the cask 1. The central axis Z passes a center within a cross section perpendicular to the longitudinal direction of the cask 1. Forms of falling or collision of the cask 1 will be explained next. FIGS. 4B to 4D are explanatory views of forms of falling or collision of the cask 1.

The forms of falling or collision of the cask 1 mainly include three forms. The form of falling or collision shown in FIG. 4B is horizontal falling or horizontal collision. This is a form in which the cask 1 falls down on or collides against a ground L a collision target surface while the central axis Z of the cask 1 is almost parallel to the ground L or the collision target surface. The form of falling or collision shown in FIG. 4C is vertical falling or vertical collision while the central axis Z of the cask 1 is almost orthogonal to the ground L or the collision target surface. The form of falling or collision shown in FIG. 4D is oblique falling or oblique collision while the central axis Z of the cask 1 is oblique relative to the ground L or the collision target surface. An oblique angle is denoted by θ. At the oblique angle θ of about 90 degrees, the form of falling or collision is the vertical falling or collision. At the oblique angle θ of about 0 degrees, the form of falling or collision is the horizontal falling or collision.

Figure 5A:
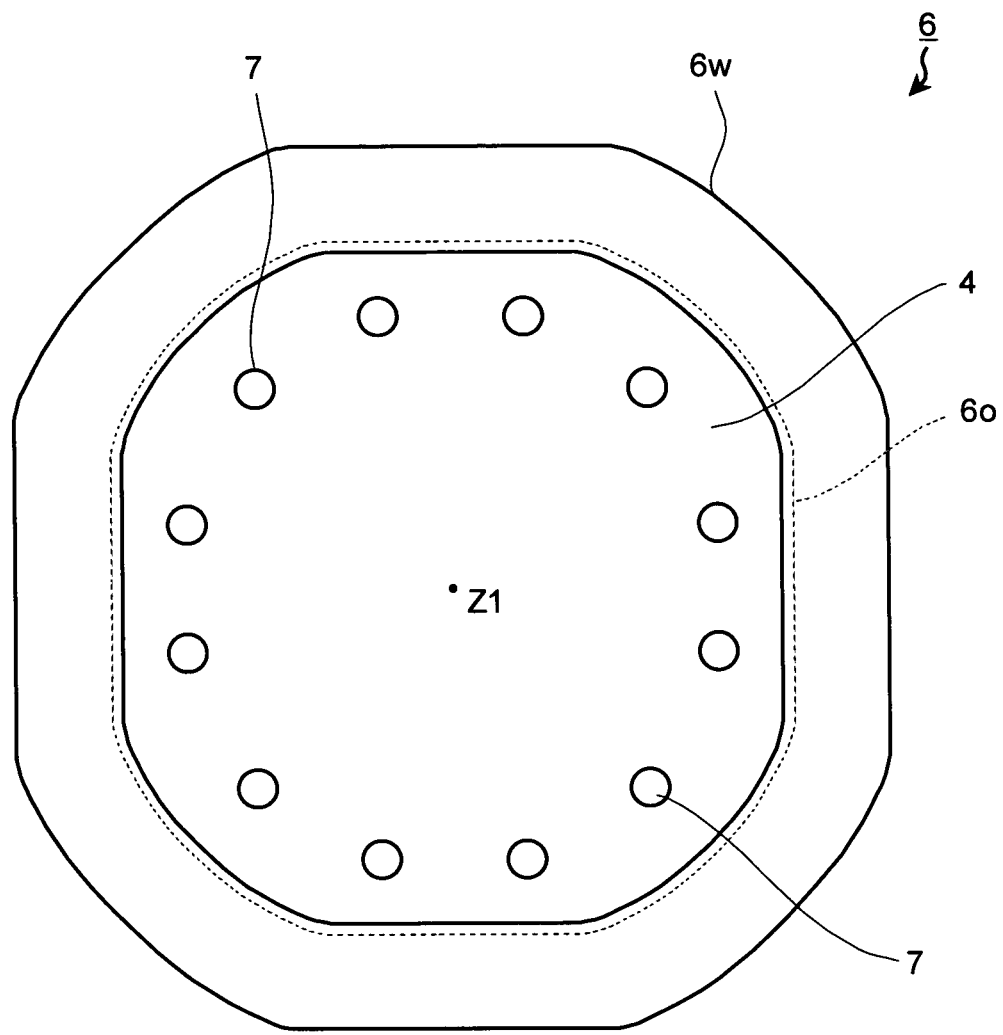
FIG. 5A is an overall front view of a buffer body according to the first embodiment.
Figure 5B:
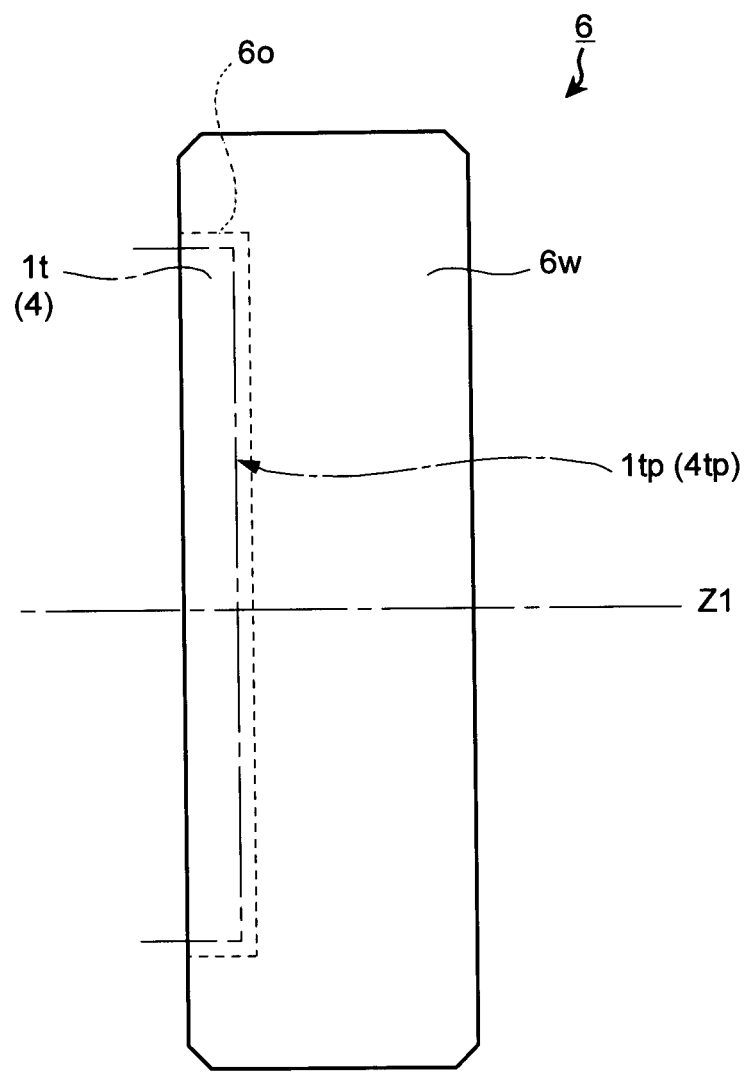
FIG. 5B is an overall side view of the buffer body according to the first embodiment.

FIG. 5A is an overall front view of the buffer body according to the first embodiment. FIG. 5B is an overall side view of the buffer body according to the first embodiment. As shown in FIGS. 5A and 5B, the buffer body 6 is constituted by containing a shock absorber, to be explained later, in an outer plate 6w, which consists of stainless steel, carbon steel or the like. In the front view, that is, if viewed from a direction parallel to a central axis Z1 of the buffer body 6 (hereinafter, "buffer body central axis Z1"), the buffer body 6 is of a disk shape configured by four circular arcs and four lines. Namely, the four square corners of the buffer body 6 are circular arc-shaped. By so forming, it is possible to make a distance between opposing sides of the buffer body 6 smaller than a distance between opposing circular arcs, and to thereby reduce an external size of the buffer body 6. It is noted that the buffer body central axis Z1 is equal to the central axis Z of the cask 1 and orthogonal to the end surface 1*tp* of the cask 1 shown in FIG. 5B (an end surface 4*tp* of the secondary lid 4 in FIG. 5B). According to the present invention, the shape of the buffer body is not limited to that of the buffer body 6 shown in FIG. 5A. The present invention is also applicable to the buffer bodies of various shapes including the circular shape viewed from the direction parallel to the buffer body central axis Z1, according to the specifications of the cask 1. Furthermore, the shape of the buffer body 6 viewed from the direction parallel to the buffer body central axis Z1 is not limited to the circular shape. For example, if the shape of the buffer body 6 viewed from the direction parallel to the buffer body central axis Z1 is the circular shape, various shapes such as a shape partially having a linear portion (that is, having a flat surface) can be selectively adopted according to the specifications of the cask 1.

As shown in FIG. 5A, the buffer body 6 according to the first embodiment is provided with a plurality of attachment holes 7 parallel to the buffer body central axis Z1 and formed on a circumference about the buffer body central axis Z1. As shown in FIGS. 5A and 5B, the buffer body 6 according to the first embodiment is provided with an opening 6*o*, and the opening 6*o* is covered on an end it of the cask 1 (the secondary lid 4 in FIGS. 5A and 5B). Fastening units (such as bolts) are inserted into the respective attachment holes 7 and screwed into the end 1*t* of the cask 1, thereby attaching the buffer body 6 to the end 1*t* of the cask 1. In the first embodiment, the buffer body 6 is fastened to the secondary lid 4. Alternatively, the buffer body 6 can be fastened or secured to the barrel main body 1*b* of the cask 1. In addition, the buffer body 6 can be attached to the cask 1 not only by being directly attached to the end it of the cask 1 by the fastening units but also by interposing an attachment member such as an attachment plate between the buffer body 6 and the cask 1. Furthermore, the buffer body 6 can be attached to the buffer body 6 by interposing a shim between an outside of the end it of the cask 1 and an inside of the opening 6*o* of the buffer body 6 so as to make a gap between the outside of the end 1 and the inside of the opening 6*o* as small as possible. An internal structure of the buffer body according to the first embodiment will be explained next.

Figure 6:
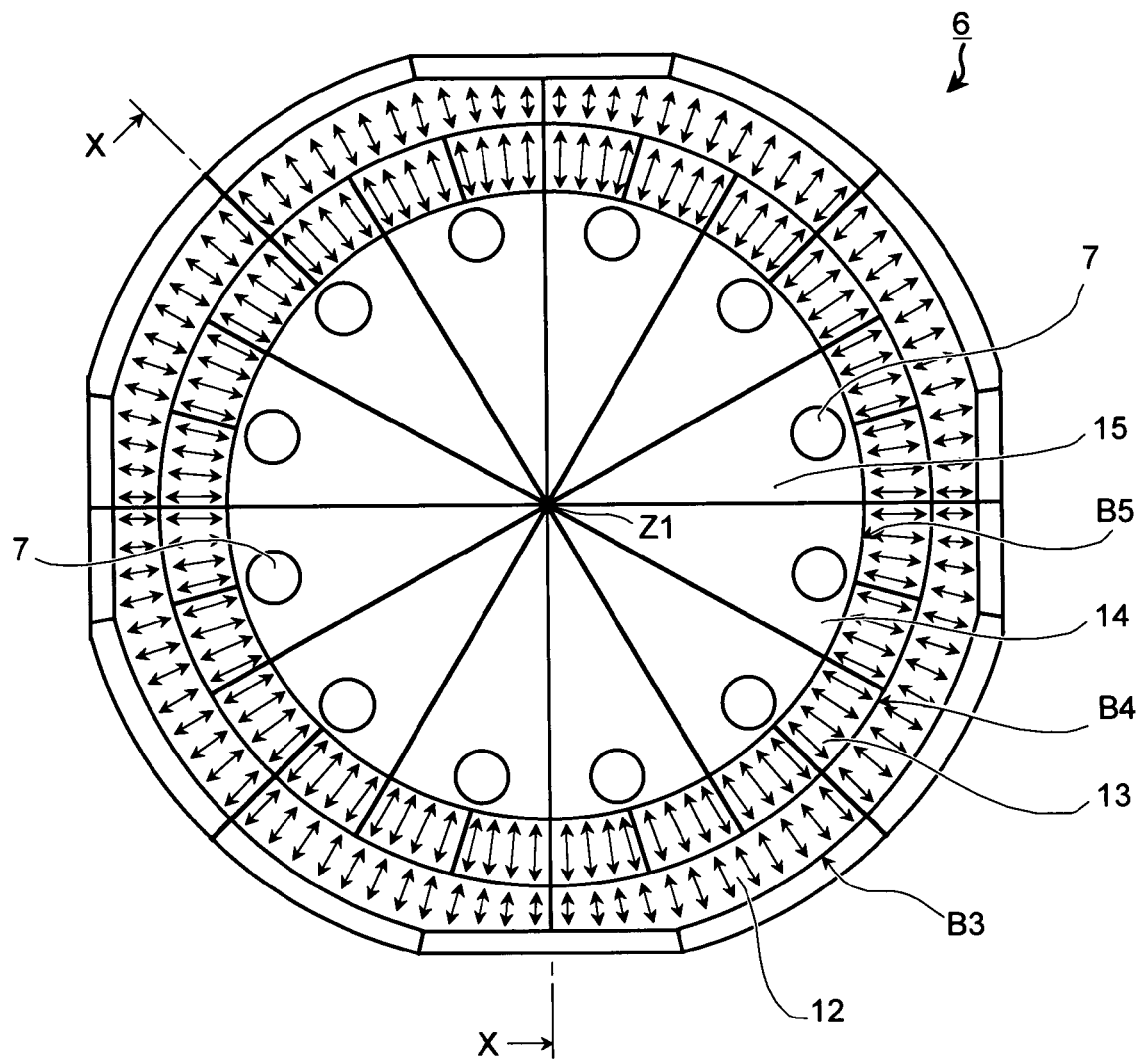
FIG. 6 is an explanatory view of the internal structure of the buffer body according to the first embodiment.
Figure 7:
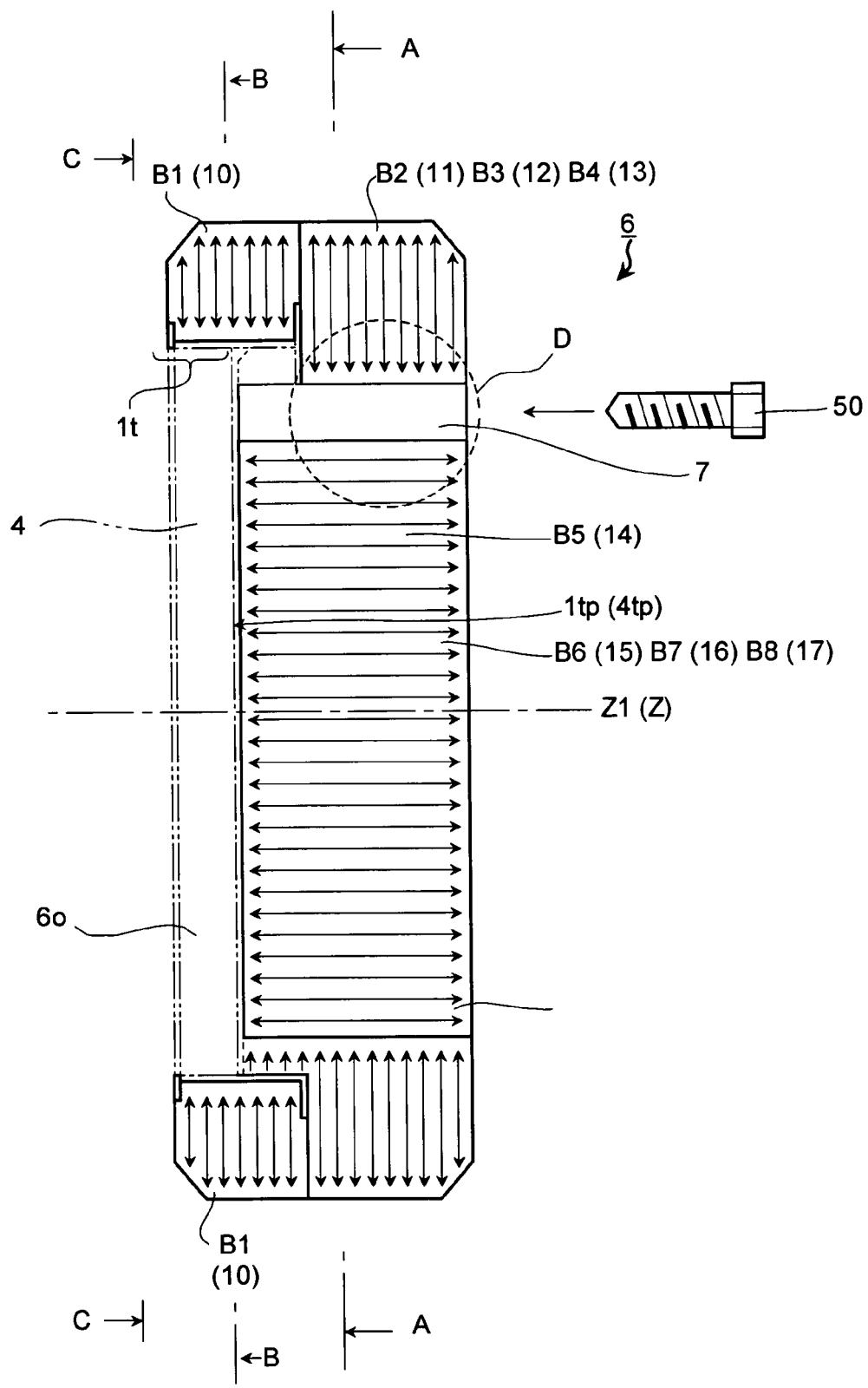
FIG. 7 is a cross-section taken along a line X-X of FIG. 6.
Figure 8:
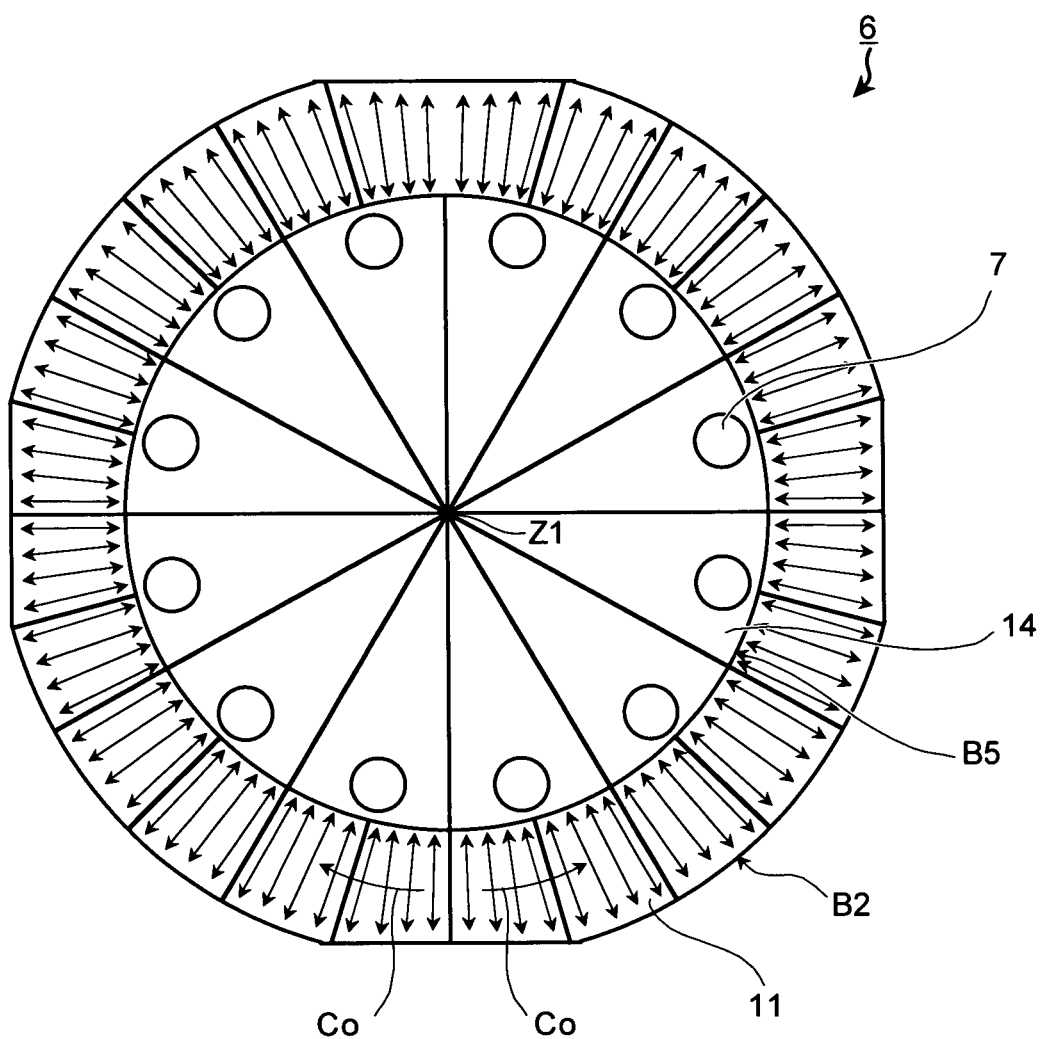
FIG. 8 is a cross-section taken along a line A-A of FIG. 7.
Figure 9:
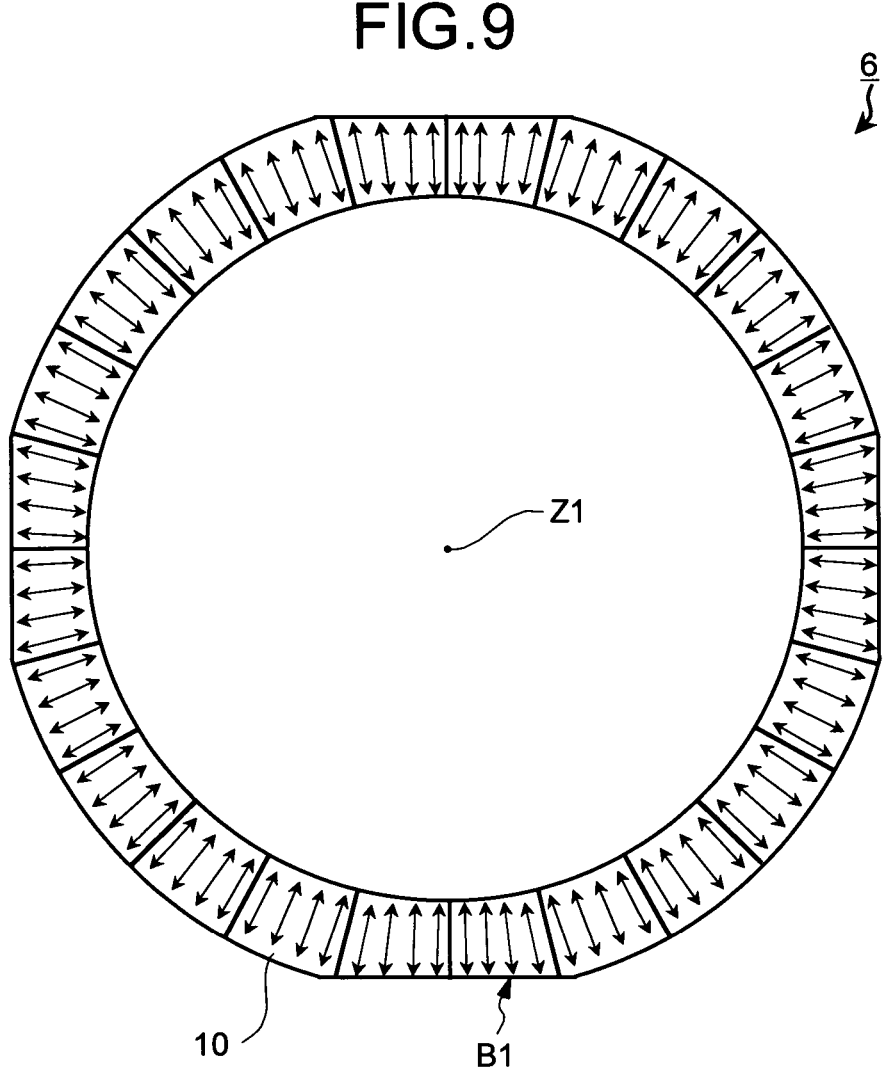
FIG. 9 is a cross-section taken along a line B-B of FIG. 7.
Figure 10:
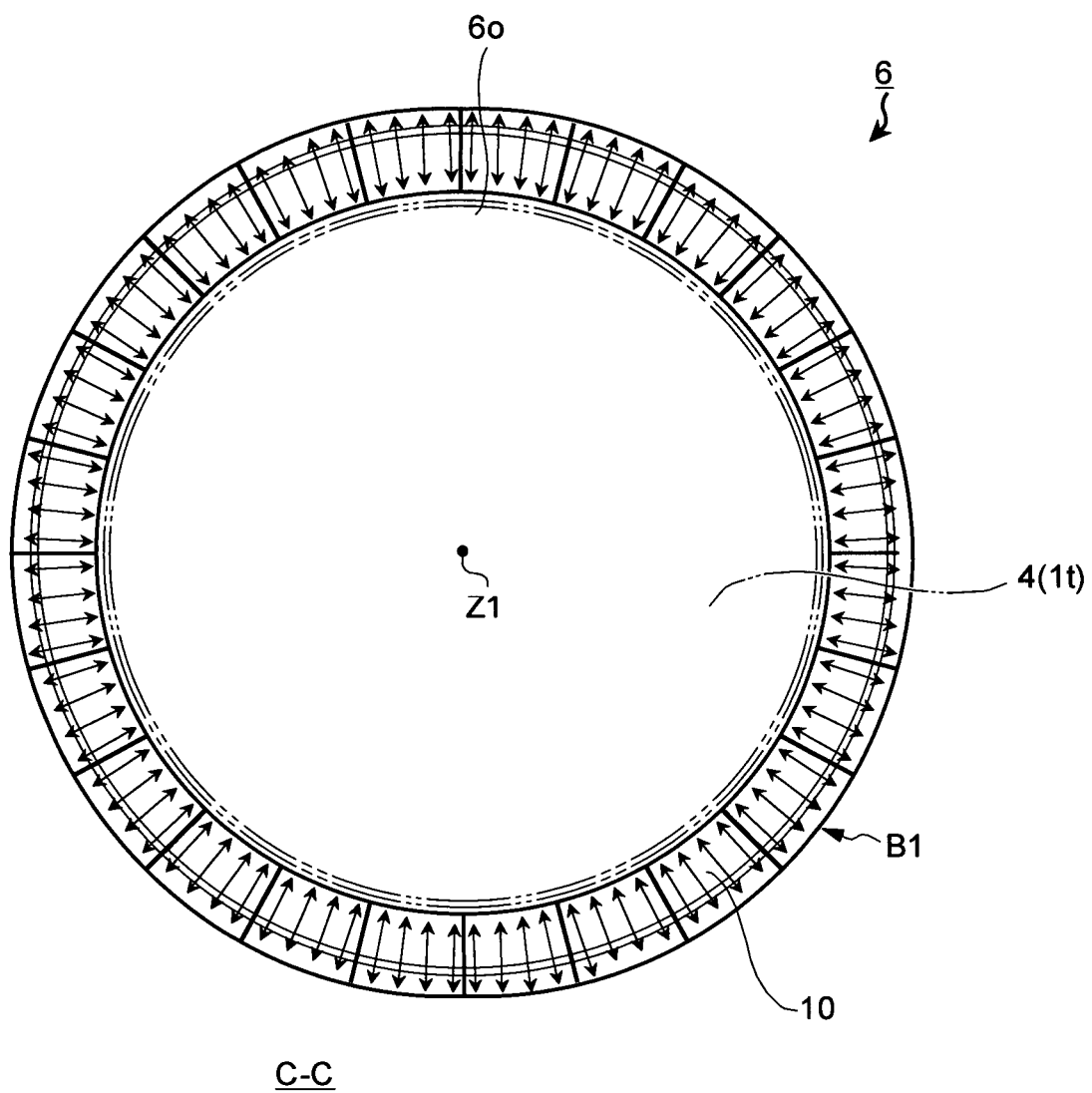
FIG. 10 is a view from line C-C of FIG. 7.

FIG. 6 is an explanatory view of the internal structure of the buffer body according to the first embodiment. FIG. 7 is a cross-section taken along a line X-X of FIG. 6. FIG. 8 is a cross-section taken along a line A-A of FIG. 7. FIG. 9 is a cross-section taken along a line B-B of FIG. 7. FIG. 10 is a view from line C-C of FIG. 7. The buffer body 6 according to the first embodiment employs wood materials as shock absorbers. Arrows in FIGS. 6 to 10 indicate directions of fibers of the wood materials that constitute the shock absorbers.

As can be seen from FIGS. 7 and 8, the buffer body 6 according to the first embodiment is configured so that the shock absorbers that absorb a shock generated when the cask 1 falls or collides are arranged within the outer plate (see FIGS. 5A and 5B). As explained above, the shock absorbers consist of the wood materials and are arranged by changing the types of the shock absorbers or the directions of the fibers of the wood materials. By doing so, the buffer body 6 according to the first embodiment can exhibit the function required as the buffer body of the cask 1.

As shown in FIG. 7, the buffer body 6 is configured by combining a first shock absorber B1, a second shock absorber B2, a third shock absorber B3, a fourth shock absorber B4, a fifth shock absorber B5, a sixth shock absorber B6, a seventh shock absorber B7, and an eighth shock absorber B8. In the first embodiment, the first shock absorber B1 corresponds to "a first shock absorber group", the second to the fourth shock absorbers B2 to B4 correspond to "a second shock absorber group", and the fifth to the eighth shock absorbers B5 to B8 correspond to "a third shock absorber group". These shock absorbers are constituted by a combination of a plurality of shock absorber blocks. In addition, the shock absorber 6 is attached to each of the both ends of the cask 1 or each of the end plates 1*p* (see FIG. 1) of the cask 1 by inserting a bolt 50, which is the fastening unit, into the attachment hole 7 and screwing the bolt 50 into a bolt hole formed in the cask 1. The bolt hole formed in the cask 1 is provided in, for example, the barrel main body 1*b* (see FIG. 1) of the cask 1 or the end surface 1*tp* of the cask 1 (the secondary lid end surface 4*tp* in FIG. 7).

Figure 11A:
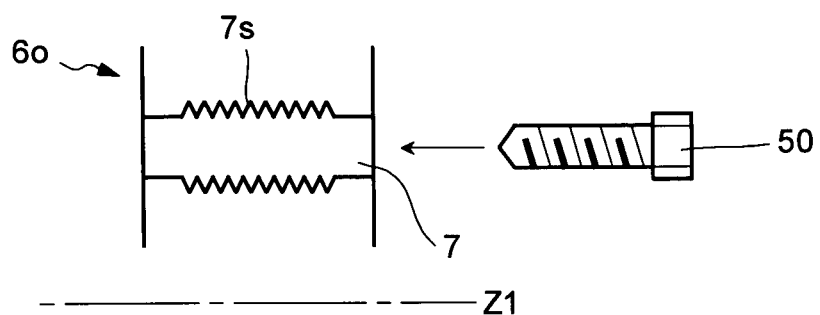
FIG. 11A is an enlarged cross-section of an attachment hole.
Figure 11B:
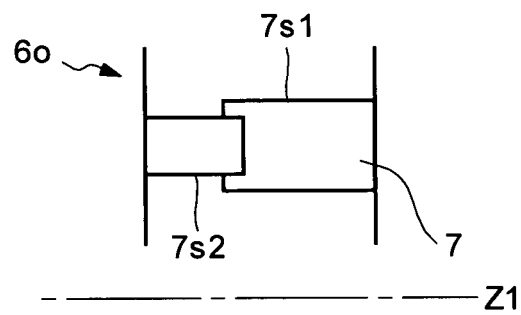
FIG. 11B is an enlarged cross-section of another configuration of the attachment hole.

FIG. 11A is an enlarged cross-section of the attachment hole. FIG. 11B is an enlarged cross-section of another configuration of the attachment hole. Both FIGS. 11A and 11B show a region D shown in FIG. 7. The attachment hole 7 of the buffer body 6 according to the first embodiment consists of a bellows 7*s* so as to be contractible and expandable in the direction of buffer body central axis Z1. The bellows 7*s* enables the attachment hole 7 to be deformed in the direction of the buffer body central axis Z1 without few resistances when the cask 1 vertically falls or collides. In addition, the bellows 7*s* can suppress sudden increase of a shock load due to deformation of the attachment hole 7 when the buffer body 6 starts to be deformed during the vertical falling or collision of the cask 1. As a result, it is possible to suppress an excessive force from acting on the bolts interposed between the primary lid 3 and the barrel main body 1*b* (see FIG. 1) and between the secondary lid 4 and the barrel main body 1*b* for securing the primary lid 3 and the secondary lid 4 during the vertical falling or collision of the cask 1, and to keep the cask 1 hermetically sealed by the gaskets. As shown in FIG. 11B, the attachment hole 7 can be configured so that ends of two cylindrical members $7s_1$ and $7s_2$ having different diameters are fitted into each other, and so that an entire length of the attachment hole 7 is reduced by the load in the direction of the buffer body central axis Z1.

The first shock absorber B1 absorbs a shock generated by the horizontal falling or collision of the cask 1. A part of an outer circumference of the buffer body 6 collides against the ground or the like when the cask 1 falls horizontally or collides against the ground or the like. Due to this, an area of the first shock absorber B1 contributing to absorbing the shock is made small. For this reason, the first shock absorber B is made of a first material having a highest compressive strength among all of the first to the eighth shock absorbers B1 to B8 constituting the buffer body 6 according to the first embodiment. If the wood material is used, oak, for example, is used as the first material. The "compressive strength" means herein a Young's modulus, a compression strength or the like when the shock absorber is compressed.

The second to the fourth shock absorbers B2 to B4 absorb a shock when the cask 1 vertically falls or collides or obliquely falls or collides. During the vertical falling or the like, surfaces of the second to the fourth shock absorbers B2 to B4 perpendicular to the buffer body central axis Z1 absorb the shock generated by the vertical falling or the like. Namely, when the cask 1 vertically falls, the buffer body 6 collides against the ground L or the like by a wider area than that during the horizontal falling and absorbs the shock. Therefore, the second to the fourth shock absorbers B2 to B4 contributing to absorbing the shock are larger in area than the first shock absorber B1. For this reason, the second to the fourth shock absorbers B2 to B4 are made of a second material lower in compressive strength than the first shock absorber B1. If the wood material is used, red cedar (western cedar), for example, is used as the second material.

The fifth to the eighth shock absorbers B5 to B8 absorb a shock generated when the cask 1 vertically falls or collides or obliquely falls or collides. The fifth to the eighth shock absorbers B5 to B8 sufficiently relax a shock force transmitted to the primary lid 3 and the secondary lid 4 (see FIG. 1). The cask 1 is kept hermetically sealed by interposing the gaskets between the primary lid 3 and the barrel main body 1b and between the secondary lid 4 and the barrel main body 1b (see FIG. 1), respectively. Therefore, the fifth to the eighth shock absorbers B5 to B8 sufficiently relax the shock such as the falling so as not to disturb the hermetic sealing. For this reason, the fifth to the eighth shock absorbers B5 to B8 are made of a third material lower in compressive strength than the second to the fourth shock absorbers B2 to B4. If the wood material is used, balsa, for example, is used as the third material. If the first to the third materials are other than the wood materials, for example, resin materials or metal materials, they can be arbitrarily selected so as to satisfy the relationship of (the compressive strength of the first material)>(the compressive strength of the second material)>(the compressive strength of the third material). Each shock absorber will be explained next.

The shock absorbers consisting of the second material will be explained. The second, the third, and the fourth shock absorbers B2 to B4 consist of the second material. As shown in FIG. 7, the third shock absorber B3 and the fourth shock absorber B4 are arranged on a shock load (shock) input side in the direction of the buffer body central axis Z1, that is, on an opposite side to the opening 6o in the direction of the buffer body central axis Z1. As shown in FIG. 6, the third shock absorber B3 and the fourth shock absorber B4 are arranged around the buffer body central axis Z1 in the proximity order of the fourth shock absorber B4 and the third shock absorber B3 to the central axis Z1. A shown in FIGS. 7 and 8, if viewed from within the cross section perpendicular to the buffer body central axis Z1, the second shock absorber B2 is arranged around the central axis Z1 and on an outermost circumference of the buffer body 6. In addition, the second shock absorber B2 is arranged between the first shock absorber B1 and the third and the fourth shock absorbers B3 and B4.

The second shock absorber B2 is constituted by a plurality of second shock absorber blocks 11. The third shock absorber B3 is constituted by a plurality of third shock absorber blocks 12. The fourth shock absorber B4 is constituted by a plurality of fourth shock absorber blocks 13. These shock absorber blocks are formed by, for example, superimposing wood materials. As shown in FIGS. 6 and 7, the second, the third, and the fourth shock absorbers B2, B3, and B4 are arranged so that directions of fibers are orthogonal to the buffer body central axis Z1. When the cask 1 vertically falls or collides, the shock load is input to the second, the third, and the fourth shock absorbers B2, B3, and B4 perpendicularly to the fiber directions. This shock load is absorbed by the second, the third, and the fourth shock absorbers B2, B3, and B4 by crashing the absorbers B2, B3, and B4 perpendicularly to the fiber directions.

The shock absorbers consisting of the third material will be explained. The fifth to the eighth shock absorbers B5 to B8 consist of the third material. As shown in FIG. 7, the fifth shock absorber B5 and the sixth shock absorber B6 are arranged on the shock load input side in the direction of the buffer body central axis Z1, that is, on the opposite side to the opening 6o in the direction of the central axis Z1. The fifth shock absorber B5 and the sixth shock absorber B6 are arranged around the central axis Z1 in the proximity order of the sixth shock absorber B6 and the fifth shock absorber B5 to the buffer body central axis Z1. As shown in FIG. 7, the fifth shock absorber B5 is arranged so that the fiber direction is parallel to the buffer body central axis Z1. The sixth shock absorber B6 is arranged so that, for example, the fiber direction is orthogonal to the buffer body central axis Z1. The fifth and the sixth shock absorbers B6 can be constituted by combinations of a plurality of fifth and sixth shock absorber blocks 14 and 15 each of which is a fan-shaped block, respectively.

As shown in FIG. 7, the seventh shock absorber B7 and the eighth shock absorber 8 are arranged in this order in the direction in which the shock load is input to the buffer body 6, that is, from the load input side of the shock absorber 6 toward the opening 6o thereof. As shown in FIGS. 7, 8, and 9, the sixth and the seventh shock absorbers B6 and B7 are cylindrical absorbers around the buffer body central axis Z1. As shown in FIGS. 7 and 8, the seventh shock absorber B7 is arranged so that the fiber direction is orthogonal to the buffer body central axis Z1 (it is noted that the seventh shock absorber B7 is not shown in FIG. 8). As shown in FIGS. 7 and 9, the eighth shock absorber B8 is arranged so that the fiber direction is parallel to the buffer body central axis Z1 (it is noted that the eighth shock absorber B8 is not shown in FIG. 9). As shown in FIGS. 8 and 9, the seventh and the eighth shock absorbers B7 and B8 are constituted by combinations of a plurality of seventh and eighth shock absorber blocks 16 and 17, each of which is a fan-shaped block, respectively.

If the cask 1 vertically falls or collides, the shock load is input to the fifth to the eighth shock absorbers B5 to B8. This shock load is absorbed by the fifth to the eighth shock absorbers B5 to B8 by crashing the fifth to the eighth shock absorbers B5 to B8 in an input direction of the shock load. It is thereby possible to keep the barrel main body 1b of the cask 1 hermetically sealed from the primary lid 3 and the secondary lid 4, respectively.

The shock absorber consisting of the first material will be explained. The first shock absorber B1 consists of the first material. As shown in FIGS. 7, 9, and 10, the first shock absorber B1 is arranged on the opening 6o side of the buffer body 6 in the direction of the buffer body central axis Z1. As shown in FIGS. 7, 9, and 10, if viewed from the opening 6o side of the buffer body 6, the first shock absorber B1 is arranged around the buffer body central axis Z1 on the outermost circumference of the buffer body 6. The first shock absorber B1 is thereby arranged to be superimposed on the end 1t of the cask 1 (the secondary lid 4 in FIGS. 7 and 10). By thus arranging the first shock absorber B1, the shock generated when the cask 1 horizontally falls or collides can be absorbed by the first shock absorber B1.

As shown in FIG. 10, the first shock absorber B1 is constituted by a combination of a plurality of first shock absorber blocks 10. These shock absorber blocks are formed by, for example, superimposing wood materials. As shown in FIGS. 7, 9, and 10, the first shock absorber B1 is arranged so that the fiber direction is orthogonal to the buffer body central axis Z1. During the vertical falling or collision of the cask 1, the shock load is input in parallel to the fiber direction of the first shock absorber B1. This shock absorber is absorbed by the first shock absorber B1 by crashing the first shock absorber B1 in parallel to the fiber direction.

The shock load generated when the cask 1 horizontally falls or collides is input from a direction orthogonal to the buffer body central axis Z1 as shown in FIG. 10. In this case, as evident from FIG. 10, the first shock absorber B1 that can contribute to absorbing the shock is a part of the first shock absorber B1 annularly arranged around the end it of the cask 1. Therefore, the first shock absorber B1 consists of the first material having a highest compressive strength among all the shock absorbers, and is arranged so that the fiber direction is parallel to the input direction of the shock load. By doing so, when the cask 1 horizontally falls or collides, the shock load can be sufficiently absorbed by part of the first shock absorber B1.

Figure 12A:
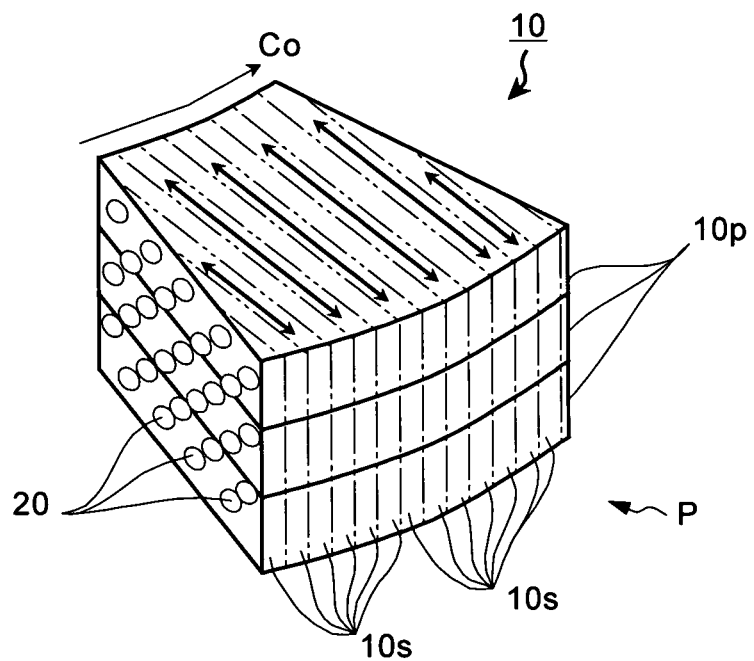
FIG. 12A is an explanatory view of an example of a first shock absorber block constituted by superimposing wood materials.
Figure 12B:
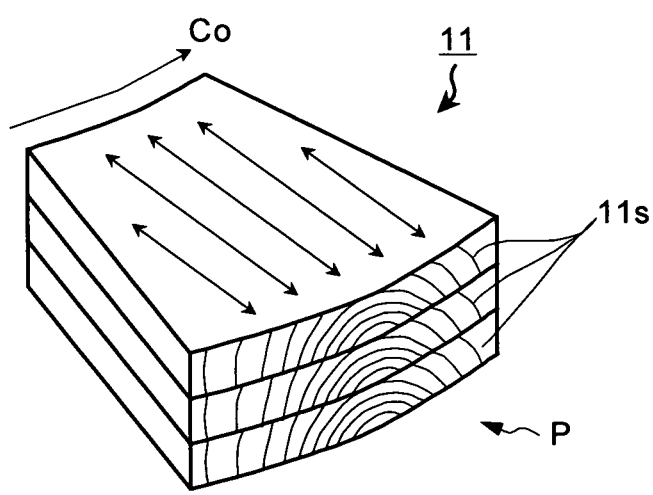
FIG. 12B is an explanatory view of an example of a second shock absorber block constituted by superimposing wood materials.

Instances of constituting the shock absorber block that constitutes each shock absorber by superimposing wood materials will be explained. FIG. 12A is an explanatory view of an example of the first shock absorber block 10 constituted by superimposing wood materials. FIG. 12B is an explanatory view of an example of the second shock absorber block 11 constituted by superimposing wood materials. In both FIGS. 12A and 12B, arrows indicate fiber directions.

As shown in FIG. 12A, the first shock absorber block 10 is manufactured by adhesively bonding and superimposing three veneers 10p each manufactured by adhesively bonding and superimposing plate pieces 10s. In the manufacturing, the plate pieces 10s are arranged so as to be parallel to one another in the fiber direction. As shown in FIG. 12B, the second shock absorber block 11 is manufactured by adhesively bonding and superimposing three plate pieces 11s. In the manufacturing, the plate pieces 11s are arranged so as to be parallel to one another in the fiber direction. The third and the fourth shock absorber blocks 12 and 13 are manufactured similarly to the second shock absorber block 11. By thus changing the manner of superimposing the wood materials according to a location of the buffer body 6, the shock absorbing characteristics according to the specifications of the buffer body 6 can be obtained.

The first shock absorber blocks 10 are arranged annularly toward the direction in which the plate pieces 10s are superimposed, and constitute the first shock absorber B1. Therefore, the plate pieces 10s that constitute each first shock absorber block 10 are superimposed toward a circumferential direction Co (see FIGS. 10 and 12A). The shock load is input to the first shock absorber blocks 10 substantially in parallel to the fiber direction, and a force in a direction in which the superimposed plate pieces 10s are peeled off (circumferential direction Co of the first shock absorber B1) acts on each first shock absorber block 10. In the first shock absorber B1 according to the first embodiment, the force of peeling off the superimposed plate pieces 10s is suppressed by the first shock absorber blocks arranged adjacently. Therefore, even if the shock load is input to the first shock absorber block 10, it is possible to suppress the superimposed plate pieces 10s from being peeled off.

Figure 13:
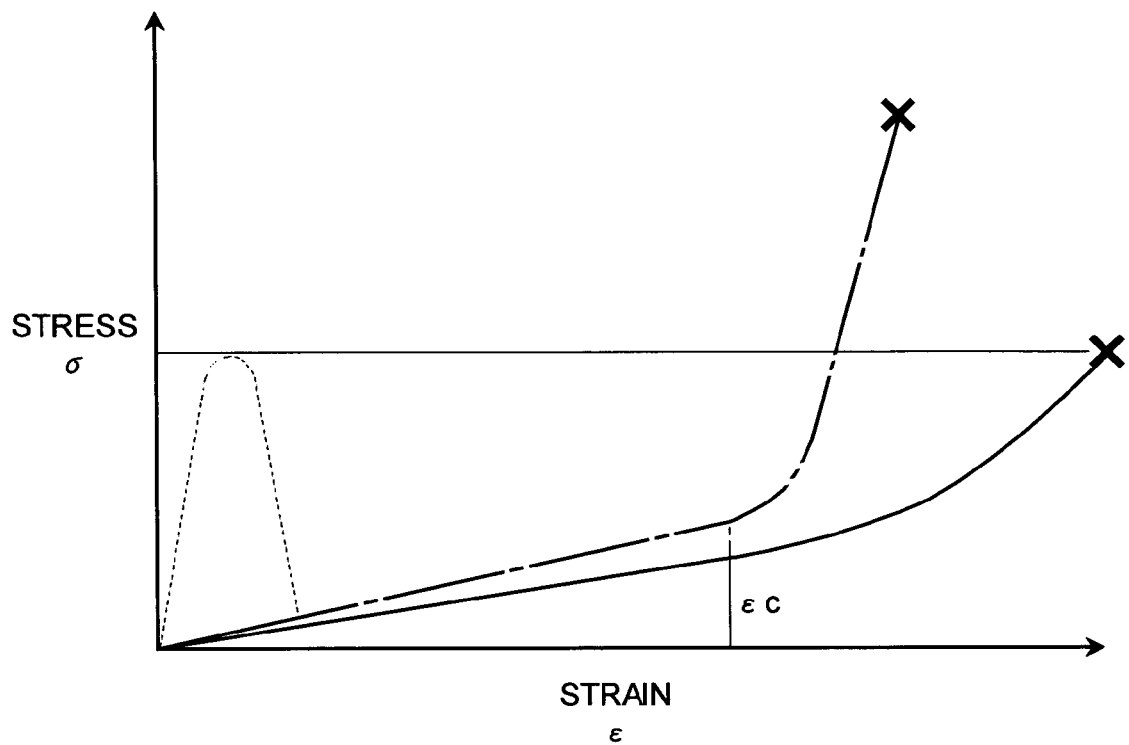
FIG. 13 is a stress-strain diagram of one example of the relationship between a stress and a strain of a wood material.
Figure 14A:
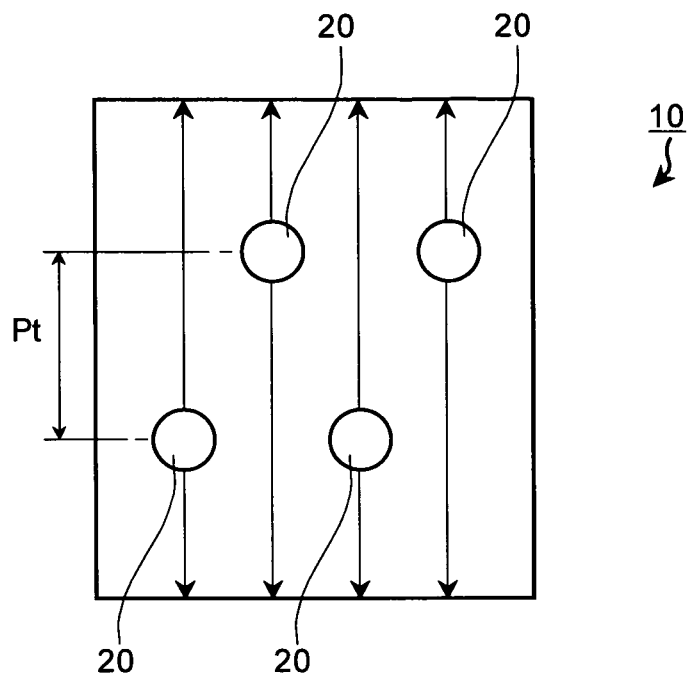
FIG. 14A is an explanatory view of an example of a method for forming holes in a shock absorber block.
Figure 14B:
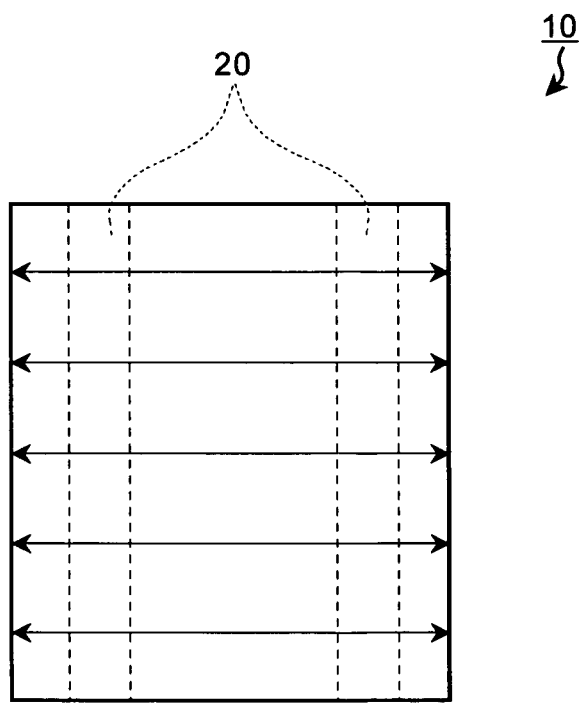
FIG. 14B is an explanatory view of an example of a method for forming holes in the shock absorber block.

FIG. 13 is a stress-strain diagram of one example of the relationship between a stress and a strain of the wood material. The stress a shown in FIG. 13 corresponds to a compressive stress. FIGS. 14A and 14B are explanatory views of examples of a method for forming holes in the shock absorber block. The wood material constituting the first shock absorber block 10 is a fiber assembly. If the shock absorber block 10 is thus constituted by the wood material, a shock load energy is absorbed by the shock absorber block 10 by causing wood fibers to be sheared or locally crashed. As a result, as shown in FIG. 13, the wood material shows a crash behavior in which the stress a rises according to a rise of the strain.

Specifically, if the stress σ rises and the strain ϵ rises, accordingly, the stress σ rapidly increases at a certain strain ϵc (indicated by a one-dot chain line in FIG. 13). In addition, the moment the shock load acts on the cask 1, an excessive initial stress is generated (indicated by a dot line in FIG. 13). Thus, the shock absorbing characteristic required of the buffer body 6 cannot be obtained unless the wood material shows a uniform crash (strain) behavior when the shock load acts on the cask 1. As a result, an excessive shock load sometimes acts on the cask 1.

The cask 1 has an entire length as large as several meters. Due to this, in a test of falling or collision of the cask 1, scaled-down models of the cask 1 and the buffer body 6 are employed. In the test, if the wood materials are used for the shock absorbers of the buffer body 6, sizes of the shock absorbers differ between the scaled-down model of the buffer body and the actual buffer body 6 while fiber widths of the shock absorbers are equal. Namely, the shock absorbers of the scaled-down model of the buffer body are relatively larger in fiber width than those of the actual buffer body 6.

The first shock absorber block 10 according to the first embodiment is provided with a plurality of holes 20 serving as spaces to cross the fibers. Thanks to the holes 20, if the shock load is input to the first shock absorber block 10, the first shock absorber block 10 can be stably crashed over entire regions of the block 10. As a result, even if the first shock absorber block 10 consists of the wood material, it can be dealt with as a uniform material. If the holes 20 are provided, a stress (indicated by symbol x on a solid line of FIG. 13) can be made lower than a crash stress (indicated by symbol x on a one-dot chain line of FIG. 13) by which the first shock absorber block 10 is crashed. Therefore, during absorption of the shock load, it is possible to suppress the excessive shock load from acting on the cask 1. In addition, even the buffer body different in size from the actual buffer body 6 (e.g., the scaled-down model of the buffer body or a scaled-up model thereof) can sufficiently ensure reproducibility of the shock absorbing performance.

These actions make it unnecessary to give an excessive margin to the shock absorbing performance of the buffer body when the buffer body 6 is made large in size. It is, therefore, possible to make the size of the buffer body 6 a necessary and sufficient size and decrease shock acceleration. As a result, it is unnecessary to considerably increase the shock absorbing performance of the cask 1 main body, and the number of recycle fuels stored in the cask 1 can be, therefore, increased. Besides, since the buffer body 6 can exhibit the sufficiently high shock absorbing performance with the necessary and sufficient size, the present invention can be applied to even a case that strict size limitation is imposed on transportation of the cask 1.

Furthermore, a pitch Pt (shown in FIG. 14A) of the holes in the fiber direction which has a great effect on the crash characteristics of the wood material is conserved between the scaled-down model of the buffer body 6 and the actual buffer body 6. It is thereby possible to make the shock absorbing characteristics of the entire shock absorber block 10 uniform between the scaled down model of the buffer body 6 and the actual buffer body 6. Differences in characteristics of the wood material according to a difference in size can be thereby reduced. This can facilitate predicting the shock absorbing characteristics of the actual buffer body 6 from the shock absorbing characteristics obtained by the scaled-down model of the buffer body 6. This can facilitate designing the actual buffer body 6 and enables the buffer body 6 to exhibit the shock absorbing characteristics as designed. Besides, the reproducibility of the shock absorbing performance can be sufficiently ensured even among different buffer bodies.

In the first embodiment, the holes 20 are provided only in the first shock absorber block 10 consisting of the first material having the highest compressive strength for the following reason. The oak used as the first material in the first embodiment is high in compressive strength and an excessive initial stress is often generated at the moment of the shock (the dot line part of FIG. 13). The holes 20 are intended to avoid this excessive initial stress and stably crash the absorbers in all regions. Depending on the shock absorbing performances required of the second, the third, and other shock absorbers B2, B3, holes can be formed in the second, the third, and other shock absorber blocks 11, 12, and the like constituting the second, the third, and other shock absorbers B2, B3, and the like, respectively.

In forming the holes 20 in the first shock absorber block 10, it is necessary to consider the fiber direction having a great effect on the crash characteristics of the wood material. To do so, it is preferable to provide the holes 20 so as to divide the fibers as shown in FIG. 14A. Alternatively, as shown in FIG. 14B, the holes 20 can be provided so as to divide the fibers within the first shock absorber block 10. The both methods can be combined. Depending on the specifications of the buffer body 6, the number of holes 20 and the pitch Pt can be set in combination.

Another example of the shock absorber blocks according to the first embodiment will be explained. While the first shock absorber block 10 constituting the first shock absorber B1 will be explained herein by way of example, the second and the third shock absorber blocks 11 and 12 constituting the second, the third, and the other shock absorbers B2, B3, and the like can be similarly applied (the same thing will apply hereafter). FIGS. 15A to 15H are explanatory views of examples of providing holes as spaces formed in the shock absorber block. In FIGS. 15A to 15H, arrow directions indicate fiber directions and symbol P denotes the shock load input to the first shock absorber block.

Figure 15A:
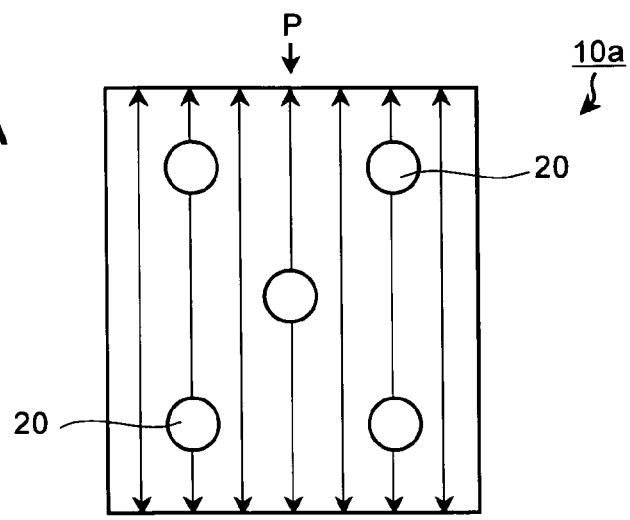
FIG. 15A is an explanatory view of an example of providing holes as spaces formed in the shock absorber block.

A first shock absorber block 10*a* shown in FIG. 15A is configured to provide the holes 20 penetrating the first shock absorber block 10*a* so as to divide the fibers and to be orthogonal to an input direction of the shock load P. By so configuring, a strength and a rigidity of the first shock absorber block 10*a* can be adjusted. By providing the holes 20 in the first shock absorber block 10*a*, cracking and crashing can be generated in sheared parts of the first shock absorber block 10*a* with the holes 20 set as points of origin. It is thereby possible to accelerate absorption of the shock energy by the first shock absorber block 10*a*.

Figure 15B:
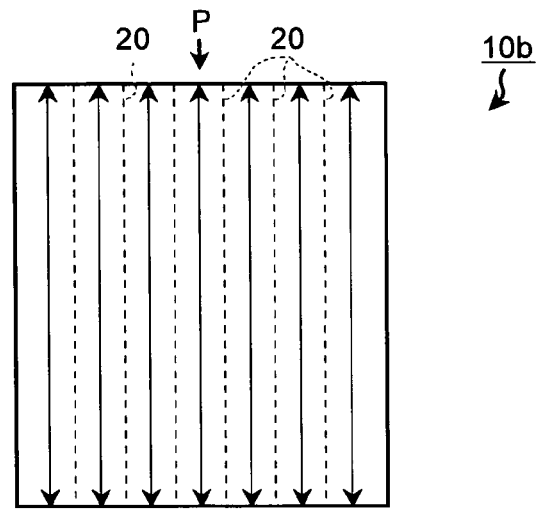
FIG. 15B is an explanatory view of an example of providing holes as spaces formed in the shock absorber block.

A first shock absorber block 10*b* shown in FIG. 15B is configured to provide the holes 20 penetrating the first shock absorber block 10*b* so as to divide the fibers and to be parallel to the input direction of the shock load P. By so configuring, a strength and a rigidity of the first shock absorber block 10*b* can be adjusted. In addition, the holes 20 can reduce an apparent cross-sectional area of the first shock absorber block 10*b*, and reduce an initial stress generated in the first shock absorber block 10*b* right after the shock load P is input to the first shock absorber block 10*b*.

Figure 15C:
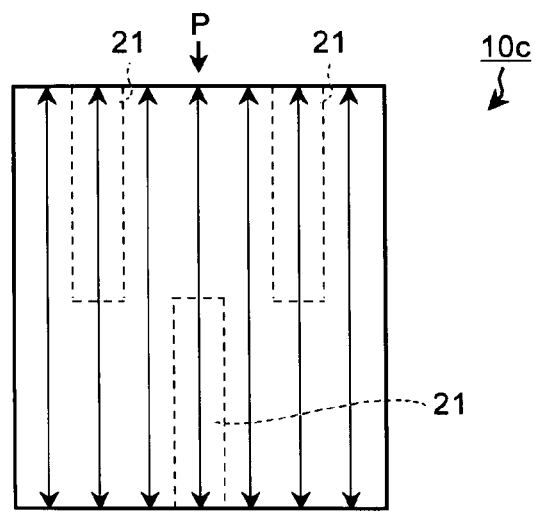
FIG. 15C is an explanatory view of an example of providing holes as spaces formed in the shock absorber block.

A first shock absorber block 10*c* shown in FIG. 15C differs from the first shock absorber block 10*b* shown in FIG. 15B in that bottomed holes 21 that do not penetrate the first shock absorber block 10*c* are provided. Even with this configuration, the first shock absorber block 10*c* can attain the same functions and advantages as those of the first shock absorber block 10*b* shown in FIG. 15B. In addition, by adjusting a depth of each bottomed hole 21, a strength and a rigidity of the first shock absorber block 10*c* can be adjusted.

Figure 15D:
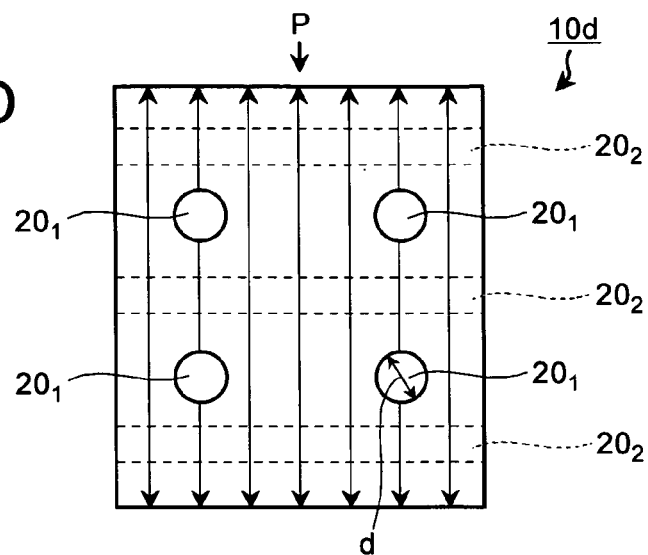
FIG. 15D is an explanatory view of an example of providing holes as spaces formed in the shock absorber block.

A first shock absorber block 10*d* shown in FIG. 15D is configured to provide first holes $20_1$ so as to divide the fibers and to be orthogonal to the input direction of the shock load P, and provide second holes $20_2$ so as to divide the fibers and to be parallel to the input direction of the shock load P. By so configuring, cracking and crashing can be generated in sheared parts of the first shock absorber block 10*d* with the first holes $20_1$ set as points of origin. It is thereby possible to accelerate absorption of the shock energy by the first shock absorber block 10*d*. At the same time, the second holes $20_2$ can reduce an apparent cross-sectional area of the first shock absorber block 10*d*, and reduce an initial stress generated in the first shock absorber block 10*d* right after the shock load P is input to the first shock absorber block 10*d*. In this example, the first holes $20_1$ and the second holes $20_2$ are located in a distorted relationship therebetween. Alternatively, the first holes $20_1$ and the second holes $20_2$ can be located to cross one another. Furthermore, at least either the first holes $20_1$ or the second holes $20_2$ can be bottomed holes. It is noted that diameters d of the first holes $20_1$ and the second holes $20_2$ are appropriately changed according to the specifications of the buffer body 6.

Figure 15E:
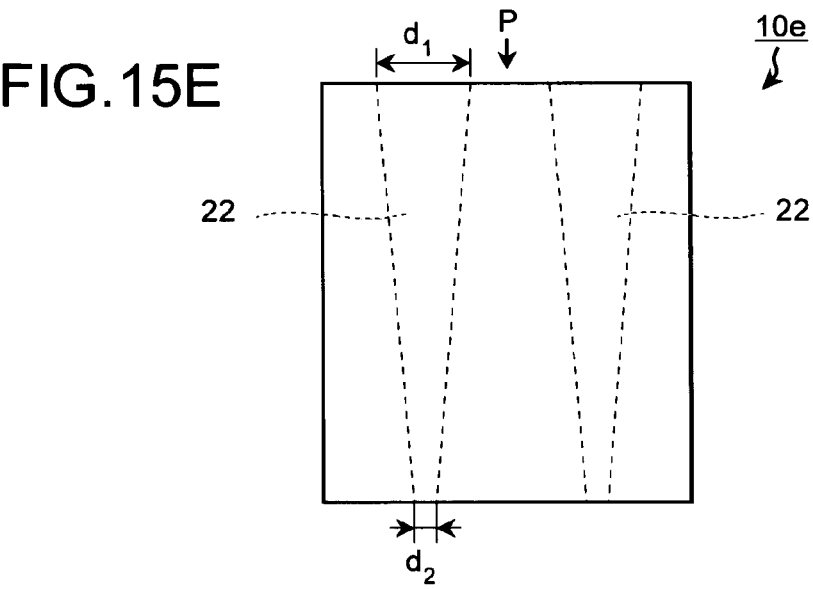
FIG. 15E is an explanatory view of an example of providing holes as spaces formed in the shock absorber block.
Figure 15F:
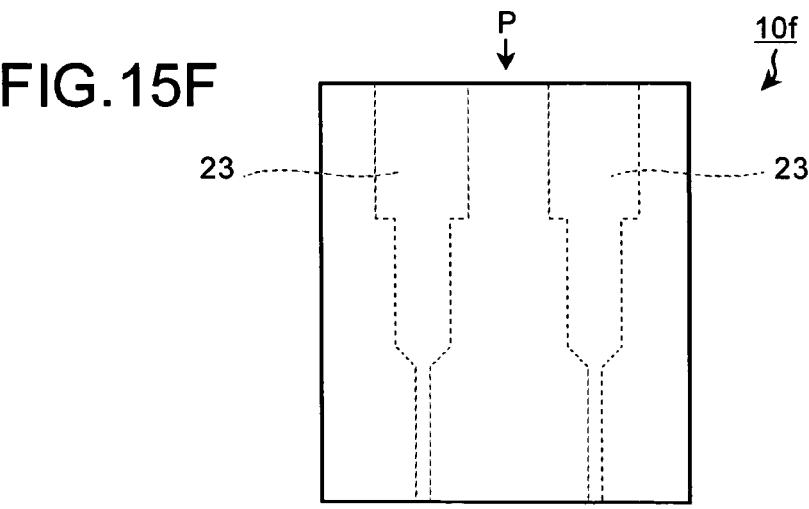
FIG. 15F is an explanatory view of an example of providing holes as spaces formed in the shock absorber block.

First shock absorber blocks 10*e* and 10*f* shown in FIGS. 15E and 15F are configured to provide holes 22 and 23 so as to divide the fibers and to be parallel to the input direction of the shock load P, and so as to reduce cross-sectional areas of the holes 22 and 23 toward the input direction of the shock load P ($d_1^2/4 > d_2^2/4$), respectively. By so configuring, the first shock absorber block 10*e* or 10*f* can be promptly crashed and the shock energy can be sufficiently absorbed by the first shock absorber block 10*e* or 10*f* right after the shock load is input to the block 10*e* or 10*f*. In addition, as the crashing of the shock absorber block 10*e* or 10*f* progresses, the shock absorber block 10*e* or 10*f* is more difficult to crash, thereby making it possible to effectively stop a motion of the cask 1. Cross-sectional areas of the holes 22 can be gradually reduced toward the input direction of the shock load P as shown in FIG. 15E. Alternatively, as shown in FIG. 15F, cross-sectional areas of the holes 23 can be reduced step by step. In the latter case, the holes 23 can be formed relatively easily.

Figure 15G:
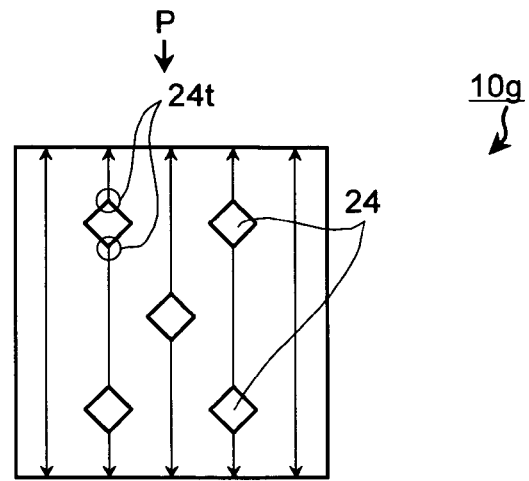
FIG. 15G is an explanatory view of an example of providing holes as spaces formed in the shock absorber block.

A first shock absorber block 10*g* shown in FIG. 15G differs from the first shock absorber block 10*a* shown in FIG. 15A only in that angular holes (rectangular holes in this embodiment) 24 are provided. As shown in FIG. 15G, the circular holes can be replaced by the angular holes 24. By doing so, cracking and crashing are generated in sheared parts of the first shock absorber block 10*g* with corners 24*t* of the angular holes 24 set as points of origin. It is thereby possible to accelerate absorption of the shock energy by the first shock absorber block 10*g*. From these viewpoints, it is preferable that the corners 24*t* of the angular holes 24 are formed on the input side of the shock load P.

Figure 15H:
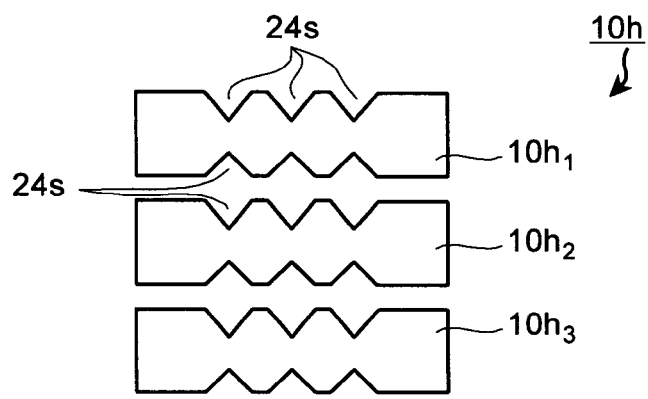
FIG. 15H is an explanatory view of an example of providing holes as spaces formed in the shock absorber block.

A first shock absorber block 10*h* shown in FIG. 15H is similar to the first shock absorber block 10*g* shown in FIG. 15G except that angular holes 24 are formed by adhesively bonding and superimposing plate materials $10h_1$, $10h_2$, and $10h_3$ having grooves 24*s* having a generally triangular cross section, and by combining the grooves 24*s*. The angular holes 24 provided in the first shock absorber block 10*g* shown in FIG. 15G can be formed by a dedicated tool. Alternatively, they can be formed by adhesively bonding and superimposing the plate materials $10h_1$ and the like having the grooves $24s$ formed therein in advance similarly to the first shock absorber block $10h$ shown in FIG. 15H.

Figure 15I:
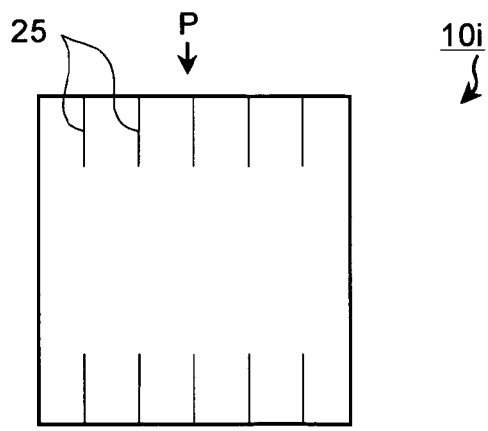
FIG. 15I is an explanatory view of an example of providing notches as spaces provided in the shock absorber block.
Figure 15J:
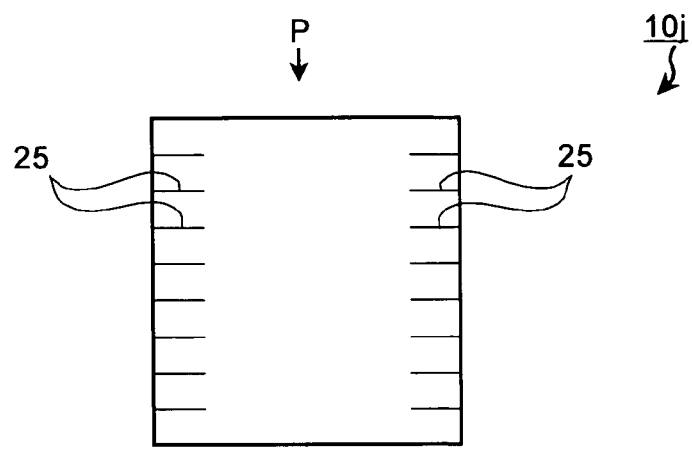
FIG. 15J is an explanatory view of an example of providing the notches as spaces provided in the shock absorber block.

FIGS. 15I and 15J are explanatory views of examples of providing notches as spaces provided in the shock absorber block. Each of first shock absorber blocks $10i$ and $10j$ is configured so that an acting direction of the shock load P is parallel to the fiber direction. As shown in FIG. 15I, the shock absorber block $10i$ is provided with notches 25 in parallel to the fiber direction. By so configuring, a strength and a rigidity of the first shock absorber block $10i$ can be adjusted, an apparent cross-sectional area of the first shock absorber block $10i$ can be reduced, and an initial stress generated when the shock load P acts on the shock absorber block $10i$ can be reduced. The notches 25 can be formed either to be parallel to the fibers or to divide the fibers. In the latter case, the effect of reducing the initial stress, when the shock load P acts on the shock absorber block $10i$, is greater. The first shock absorber block $10j$ shown in FIG. 15J is provided with the notches 25 so as to be orthogonal to the fiber direction. By so configuring, a strength and a rigidity of the first shock absorber block $10i$ can be adjusted. By reducing the rigidity of the overall first shock absorber block $10j$, lockup can be delayed. This enables the first shock absorber block $10j$ to stably absorb the shock energy.

Figure 15K:
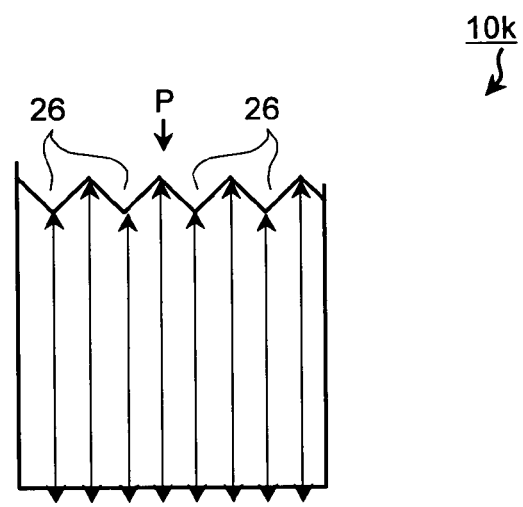
FIG. 15K is an explanatory view of an example of providing wedge notches as spaces provided in the shock absorber block.
Figure 15L:
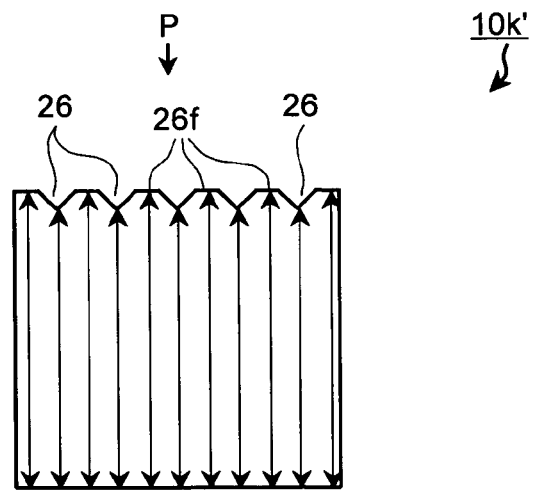
FIG. 15L is an explanatory view of an example of providing the wedge notches as spaces provided in the shock absorber block.

FIGS. 15K and 15L are explanatory views of examples of providing wedge notches as spaces provided in the shock absorber block. In FIGS. 15K and 15L, arrows indicate fibers. A first shock absorber block $10k$ shown in FIG. 15K is configured to form wedge notches 26 on the input side of the shock load P so that tops of the wedges (tops of the notches) are oriented to the acting direction of the shock load P. By so configuring, a strength and a rigidity of the first shock absorber block $10k$ can be adjusted, an apparent cross-sectional area of the first shock absorber block $10k$ can be reduced, and an initial stress when the shock load P acts on first shock absorber block $10k$ can be reduced. Furthermore, cracking and crashing can be generated in sheared parts of the first shock absorber block $10k$ with the tops of the grooves 26 set as points of origin. In addition, absorption of the shock energy by the first shock absorber block $10k$ can be accelerated. The grooves 26 can be provided in a part of the shock load input side of the first shock absorber block $10k$. Alternatively, the grooves 26 can be provided entirely on the shock load input side as shown in FIG. 15K.

A first shock absorber block $10k'$ shown in FIG. 15L is configured to form the wedge notches 26 on the input side of the shock load P similarly to the first shock absorber block $10k$ shown in FIG. 15K. Furthermore, flat portions $26f$ are formed between adjacent notches 26. By thus providing the flat portions $26f$, it is possible to ensure that the first shock absorber block $10k'$ absorbs the shock with a narrow crash margin.

Figure 15M:
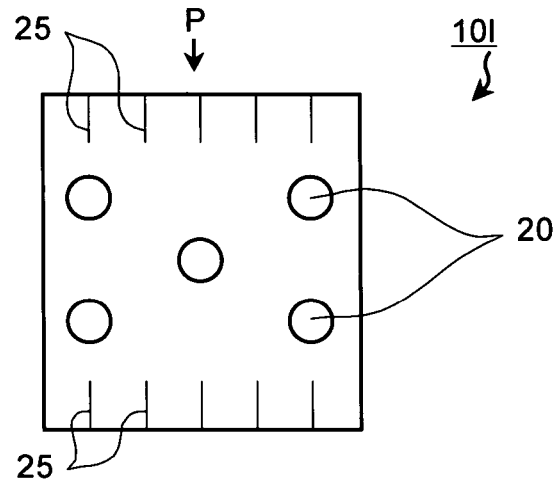
FIG. 15M is an explanatory view of an example of providing first shock absorber block spaces by a combination of different shapes.

FIGS. 15M to 15Q are explanatory views of examples of providing first shock absorber block spaces by a combination of different shapes. A first shock absorber block $10l$ shown in FIG. 15M is provided with the holes 20 and the notches 25 orthogonal to the fibers. By so configuring, a strength and a rigidity of the first shock absorber block $10l$ can be adjusted. Furthermore, cracking and crashing can be generated in sheared parts of the first shock absorber block $10l$ with the holes 20 set as points of origin, and absorption of the shock energy by the first shock absorber block $10l$ can be accelerated. In addition, an apparent cross-sectional area of the first shock absorber block $10l$ can be reduced, and an initial stress when the shock load P acts on the first shock absorber block $10l$ can be reduced.

Figure 15N:
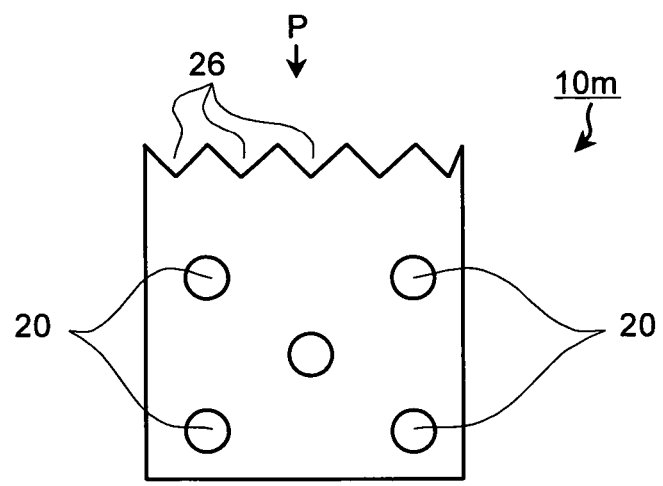
FIG. 15N is an explanatory view of an example of providing first shock absorber block spaces by a combination of different shapes.

A first shock absorber block $10m$ shown in FIG. 15N is provided with wedge notches 26. The wedge notches 26 are formed on the input side of the shock load P so that the tops of the wedges are oriented to the acting direction of the shock load P. By so configuring, a strength and a rigidity of the first shock absorber block $10m$ can be adjusted. Furthermore, cracking and crashing can be generated in sheared parts of the first shock absorber block $10m$ with the holes 20 set as points of origin, and absorption of the shock energy by the first shock absorber block $10m$ can be accelerated. In addition, an apparent cross-sectional area of the first shock absorber block $10m$ can be reduced, and an initial stress when the shock load P acts on the first shock absorber block $10m$ can be reduced.

Figure 15O:
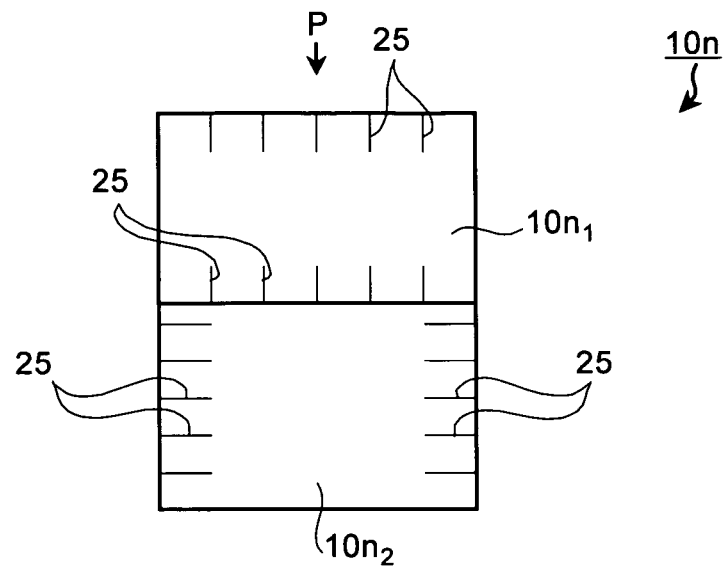
FIG. 15O is an explanatory view of an example of providing first shock absorber block spaces by a combination of different shapes.

A first shock absorber block $10n$ shown in FIG. 15O is configured to superimpose a first block $10n_1$ provided with the notches 25 parallel to the fibers and a second block $10n_2$ provided with the notches 25 orthogonal to the fibers. By so configuring, a strength and a rigidity of the first shock absorber block $10n$ can be adjusted. Furthermore, an apparent cross-sectional area of the first shock absorber block $10n$ can be reduced, and an initial stress when the shock load P acts on the first shock absorber block $10n$ can be reduced. In addition, by reducing the rigidity of the entire first shock absorber block $10n$, lockup can be delayed.

In the example of FIG. 15O, at least one of a pitch and a depth of the notches 25, 25 can be changed. For instance, the depth of the notches 25 provided in the second block $10n_2$ to be orthogonal to the fibers is gradually made smaller toward the acting direction of the shock load P, i.e., toward an outer peripheral side of the first shock absorber B1 (see FIG. 10). The shock absorber block $10n$ thus configured can be manufactured more easily than the shock absorber block provided with holes cross-sectional areas of which are gradually made smaller toward the acting direction of the shock load P (see FIGS. 15E and 15F). Accordingly, the first shock absorber block $10n$ can attain the same functions and advantages as those of the shock absorber block provided with holes cross-sectional areas of which are gradually made smaller toward the acting direction of the shock load P more easily.

Figure 15P:
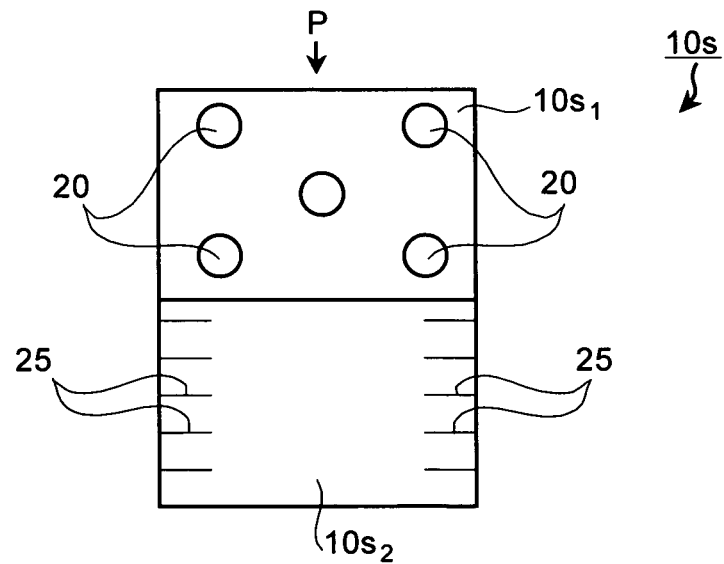
FIG. 15P is an explanatory view of an example of providing first shock absorber block spaces by a combination of different shapes.

A first shock absorber block $10s$ shown in FIG. 15P is configured to superimpose a first block $10s_1$ provided with the holes 20 and a second block $10s_2$ provided with the notches 25 orthogonal to the fibers. By so configuring, a strength and a rigidity of the first shock absorber block $10s$ can be adjusted. Furthermore, cracking and crashing can be generated in sheared parts of the first shock absorber block $10s$ with the holes 20 set as points of origin, and absorption of the shock energy by the first shock absorber block $10s$ can be accelerated. In addition, by reducing the rigidity of the entire first shock absorber block $10s$, lockup can be delayed. Alternatively, the first shock absorber block $10s$ can be configured by one block without superimposing the two blocks.

Figure 15Q:
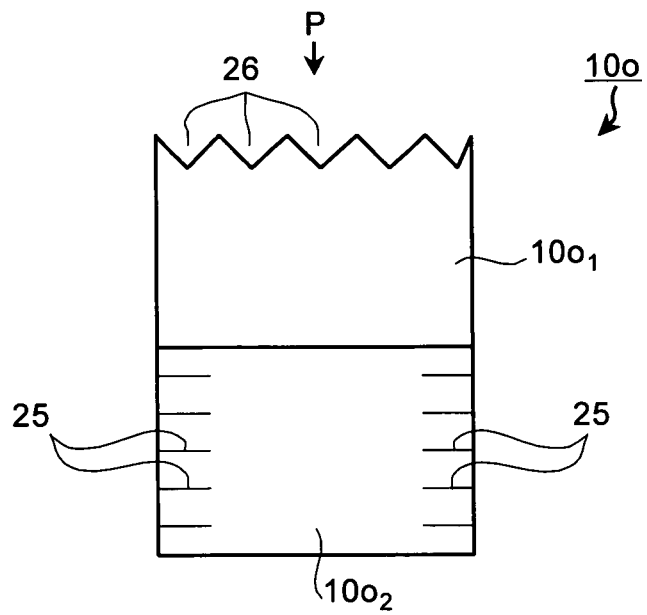
FIG. 15Q is an explanatory view of an example of providing first shock absorber block spaces by a combination of different shapes.

A first shock absorber block $10o$ shown in FIG. 15Q is configured to superimpose a first block $10o_1$ provided with the wedge notches 26 and a second block $10o_2$ provided with the notches 25 orthogonal to the fibers. By so configuring, a strength and a rigidity of the first shock absorber block $10o$ can be adjusted. Furthermore, an apparent cross-sectional area of the first shock absorber block $10o$ can be reduced, and an initial stress when the shock load P acts on the first shock absorber block $10o$ can be reduced. By reducing the rigidity of the entire first shock absorber block $10o$, lockup can be delayed. Alternatively, this first shock absorber block 10o can be configured by one block without superimposing the two blocks.

Figure 15R:
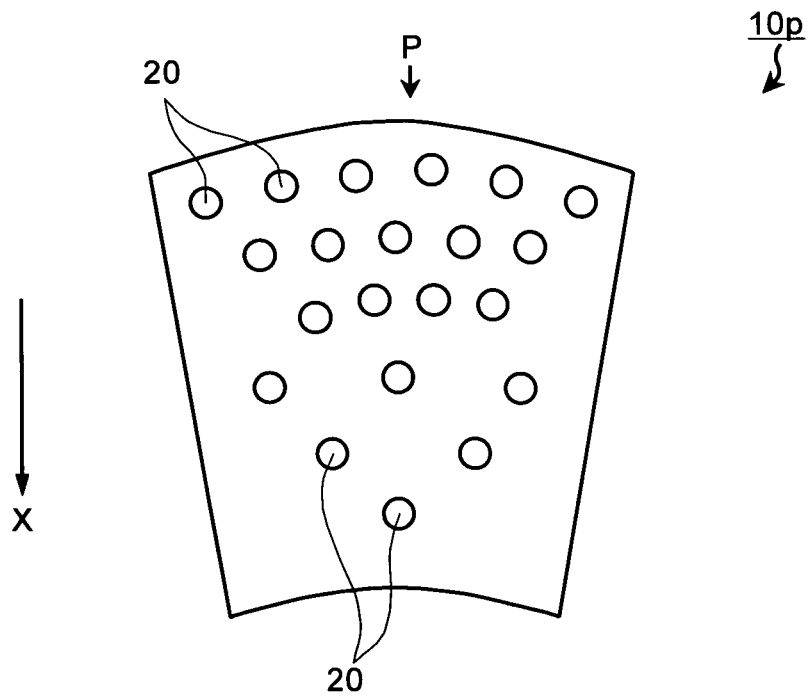
FIG. 15R is an explanatory view of an example of changing the type, the number or areas of holes provided in the first shock absorber block in an input direction of a shock load.
Figure 15S:
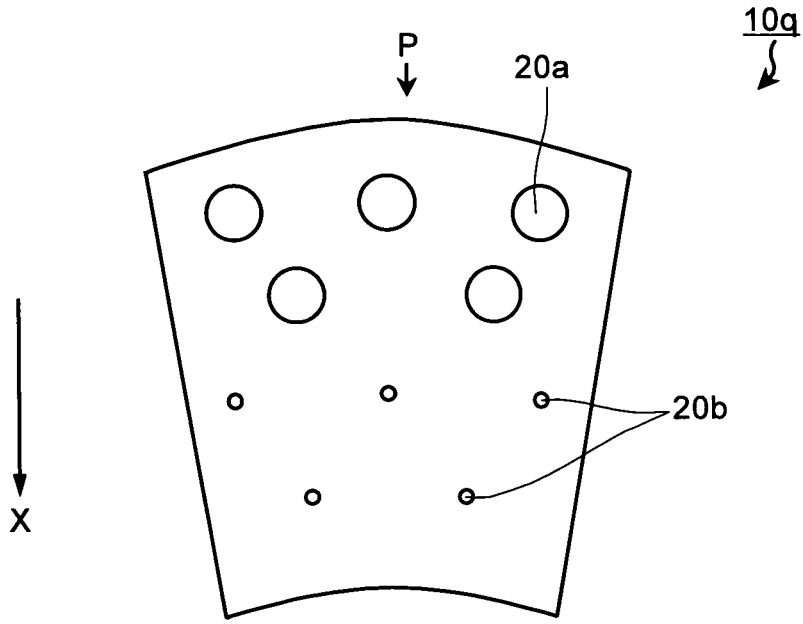
FIG. 15S is an explanatory view of an example of changing the type, the number or areas of holes provided in the first shock absorber block in an input direction of a shock load.
Figure 15T:
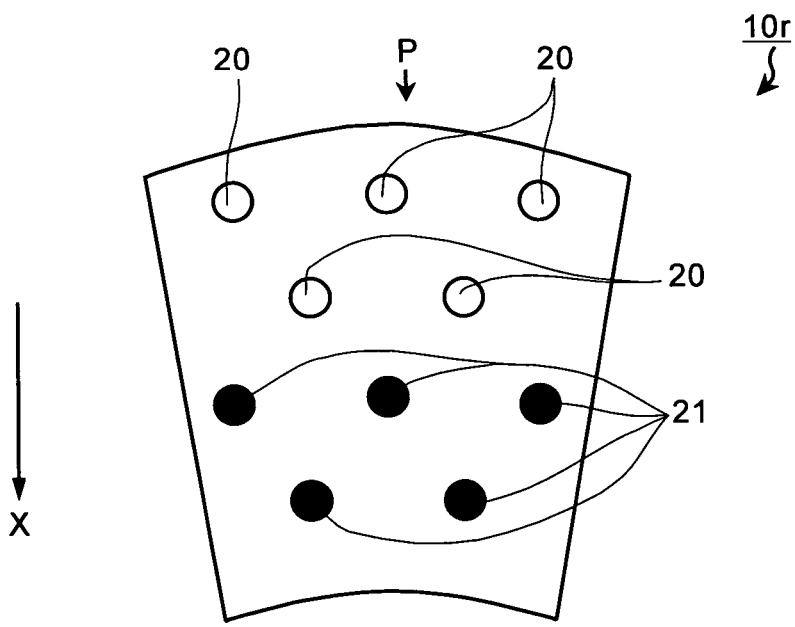
FIG. 15T is an explanatory view of an example of changing the type, the number or areas of holes provided in the first shock absorber block in an input direction of a shock load.

FIGS. 15R to 15T are explanatory views of examples of changing the type, the number or areas of holes provided in the first shock absorber block in the input direction of the shock load. In each of FIGS. 15R to 15T, a fiber direction is parallel to the input direction of the shock load P (arrow X direction). A first shock absorber block 10p shown in FIG. 15R is configured so that the number of holes 20 per unit area is decreased toward the input direction of the shock load P. A first shock absorber block 10q shown in FIG. 15S is configured so that a cross-sectional area of each hole 20a on the input side of the shock load P is smaller than that of each hole 20b on the opposite side to the input side of the shock load P. A first shock absorber block 10r shown in FIG. 15T is configured so that the holes 20 on the input side of the shock load P are through holes and those on the opposite side to the input side of the shock load P are bottomed holes 21. By so configuring, strengths and rigidities of the first shock absorber blocks 10p, 10q, and 10r can be adjusted. In addition, each of the first shock absorber blocks 10p, 10q, and 10r is promptly crashed right after the shock load is input thereto, sufficiently absorbs shock energy, and is difficult to crash as crashing progresses. The motion of the cask 1 can, therefore, effectively stopped.

Figure 15U:
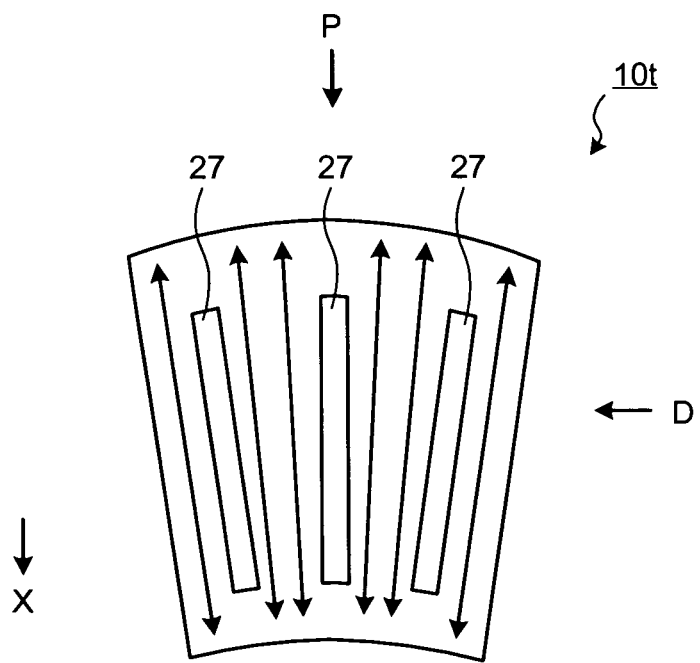
FIG. 15U is an explanatory view of one example of the first shock absorber block having slots provided in parallel to texture.
Figure 15V:
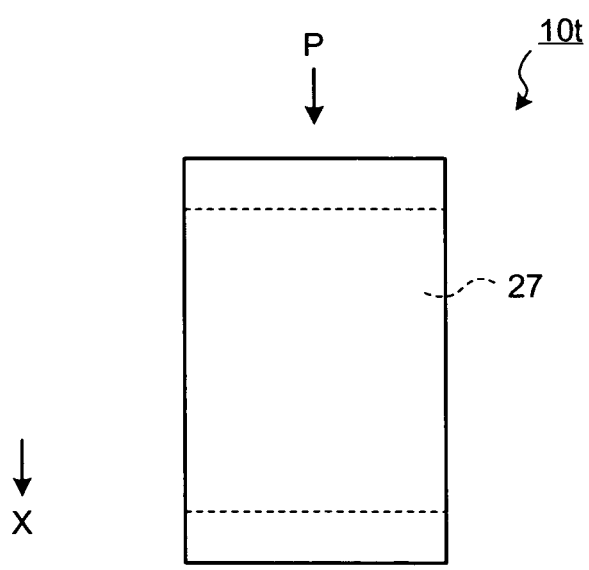
FIG. 15V is an explanatory view of one example of the first shock absorber block having slots provided in parallel to texture.

FIGS. 15U and 15V are explanatory views of one example of the first shock absorber block having slots provided in parallel to texture. FIG. 15V shows a state where FIG. 15U is viewed from an arrow D direction. This first shock absorber block 10t is configured so that slots 27 serving as spaces are provided substantially in parallel to a direction of fibers of a wood material that constitutes the first shock absorber block 10t. The fiber direction is a direction indicated by solid lines each having arrows on both ends in FIG. 15U. An input direction of the shock load P is a direction indicated by an arrow X in FIGS. 15U and 15V.

In the first shock absorber block 10t, since the slots 27 are provided in parallel to the fiber direction of the wood material, it is possible to make it easier that shear fracture occurs to the first shock absorber block 10t in response to compressive load. As a result, if the shock load P acts as the compressive load and even a material having a high compressive strength is used, it is possible to further ensure absorbing the shock load P. Therefore, during falling or collision of the cask 1, the cask 1 can be ensured to be protected.

As shown in FIG. 15V, the slot 27 can either penetrate or not penetrate the first shock absorber block 10t. In addition, a mixture of slots penetrating the first shock absorber block 10t and those which do not penetrate it can be provided. A length of each slot 27 in the fiber direction of the wood material, a width of the slot 27 orthogonal to the fiber direction of the wood material, and the number of slots 27 can be arbitrarily changed according to the material of the first shock absorber block lot, specifications of the cask buffer body, and the like. Besides, the configuration of the first shock absorber block 10a, 10b or the like can be combined with that of the first shock absorber block 10t.

As explained so far, according to the first embodiment, the holes, the notches or the other spaces are provided in each of the shock absorbers that constitute the buffer body so as to adjust the shock absorbing characteristics of the shock absorber. By doing so, even if each shock absorber consists of the material or particularly the wood material to which the excessive initial stress occurs at the moment of shock and the crash behavior of which has poor reproducibility, it is possible to make the shock absorbers have uniform shock absorbing characteristics and exhibit a stable shock absorbing performance.

Furthermore, by providing the holes, the notches or the other spaces in each of the shock absorbers consisting of the wood materials and constituting the buffer body, the shock absorber can be crashed over the entire region of the wood material. Therefore, the shock absorber can be dealt with as the uniform material. As a result, occurrence of the excessive initial stress right after the shock load acts on the shock absorbers can be suppressed, and the shock absorbers can exhibit the stable shock absorbing performances with good reproducibility. In the first embodiment, the first shock absorber and the first shock absorber block have been mainly explained. The same thing is true for the other shock absorbers and the other shock absorber blocks.

Second Embodiment

Figure 16:
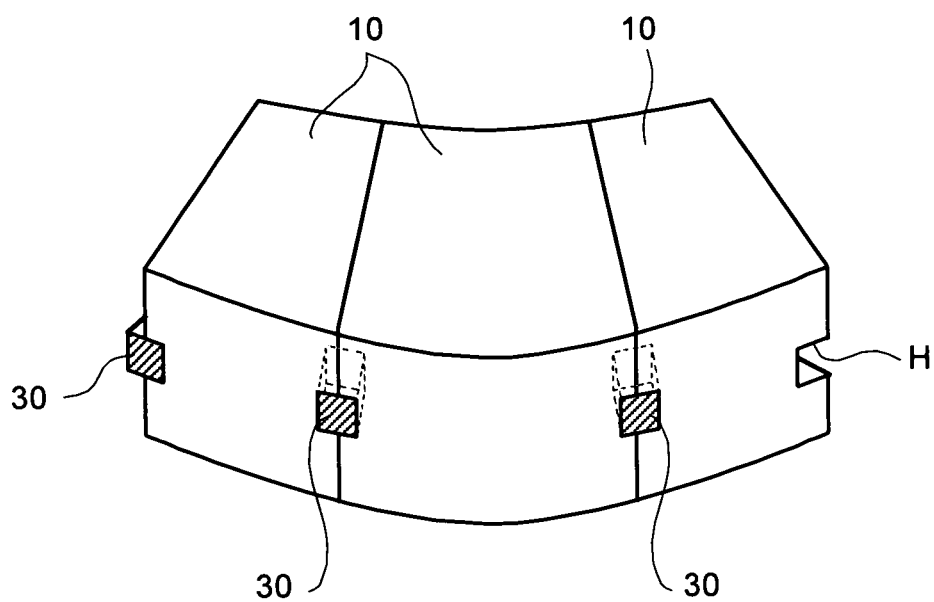
FIG. 16 is an explanatory view of an example of combining the first shock absorber blocks using antiskid members.

In a second embodiment, a block combination structure in which the first, the second and other shock absorbers B1, B2, and the like are constituted by combining the first, second, and other shock absorber blocks 10, 10a, 11, and the like will be explained. The first shock absorber block 10 constituting the first shock absorber B1 will be explained herein by way of example. This can apply to the second and the third shock absorber blocks 11 and 12 constituting the second, the third and other shock absorbers B2, B3, and the like. FIG. 16 is an explanatory view of an example of combining the first shock absorber blocks using antiskid members. In this block combination structure, a groove H is provided in each first shock absorber block 10. Antiskid members 30 are incorporated into grooves H when a plurality of first shock absorbers are combined, thereby preventing the first shock absorbers from being shifted relative to one another. If the same material as that for the first shock absorber block 10 is used for the antiskid member 30, a behavior of the antiskid member 30 during absorption of the shock can be made equal to that of the first shock absorber block 10.

Figure 17A:
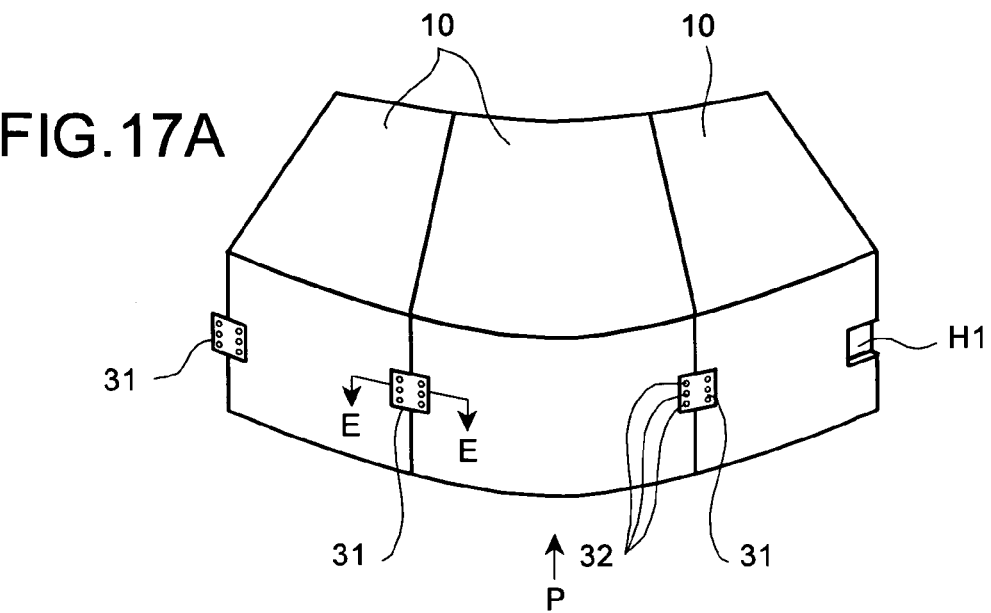
FIG. 17A is an explanatory view of another example of combining the first shock absorber blocks using the antiskid members.
Figure 17B:
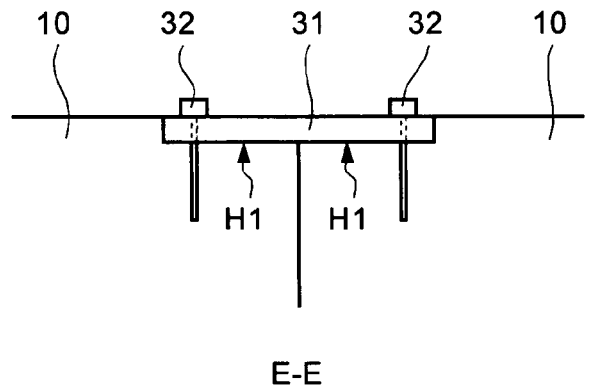
FIG. 17B is a cross-section taken along a line E-E of FIG. 17A.
Figure 17C:
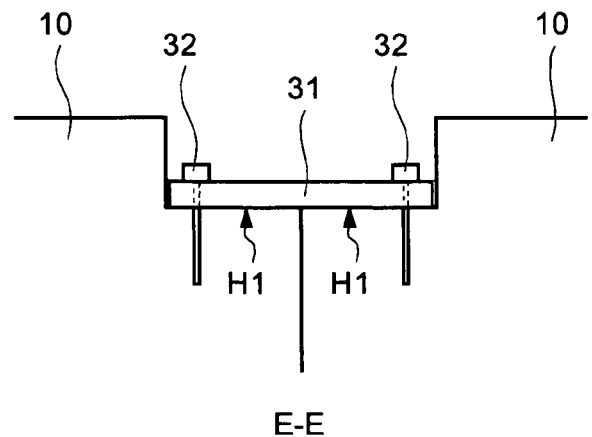
FIG. 17C is another cross-section taken along the line E-E of FIG. 17A.

FIG. 17A is an explanatory view of another example of combining the first shock absorber blocks using the antiskid members. FIG. 17B is a cross-section taken along a line E-E of FIG. 17A. FIG. 17C is another cross-section taken along the line E-E of FIG. 17A. In this block combination structure, a concave portion $H_1$ is provided in each first shock absorber block 10. Plate-like antiskid members 31 are attached to respective concave portions $H_1$ when a plurality of first shock absorber blocks 10 is combined. In addition, the antiskid members 31 are fixed to the adjacent first shock absorber blocks 10 by screws 32 or bolts serving as fixing units, thereby preventing the first shock absorber blocks 10 from being shifted relative to one another. If a metal plate such as an iron plate or an aluminum plate is used as the antiskid member 31, sufficient rigidity can be ensured even if the antiskid member 31 is made thin. It is thereby possible to reduce a depth of the concave portion $H_1$ formed in each first shock absorber block 10, and minimize an influence of the concave portion $H_1$ on the first shock absorber block 10. As shown in FIG. 17C, the depth of the concave portion $H_1$ is preferably set so that a top of the screw 32 or bolt serving as the fixing unit and the antiskid member 31 do not protrude from an outer peripheral surface of the first shock absorber block 10. By so setting, it is possible to suppress an initial shock generated in the first shock absorber block 10 from being increased by the top of the screw 32 or bolt serving as the fixing means and by the antiskid member 31 during falling or collision of the cask 1.

Figure 18A:
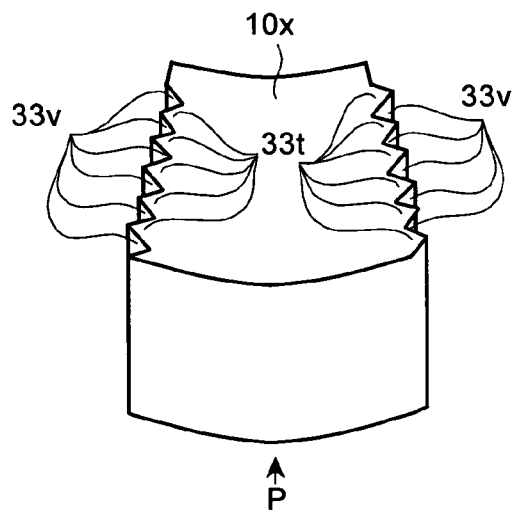
FIG. 18A is an explanatory view of an example of combining the first shock absorber blocks by forming an antiskid portion in each first shock absorber block itself.
Figure 18B:
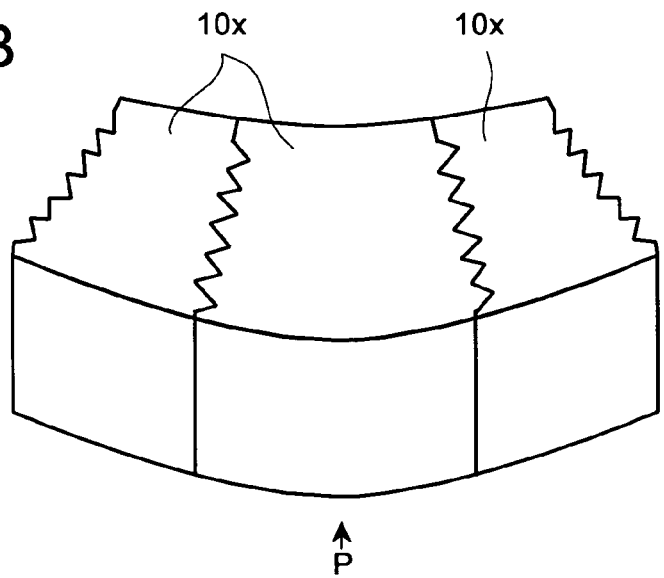
FIG. 18B is an explanatory view of an example of combining the first shock absorber blocks by forming an antiskid portion in each first shock absorber block itself.
Figure 18C:
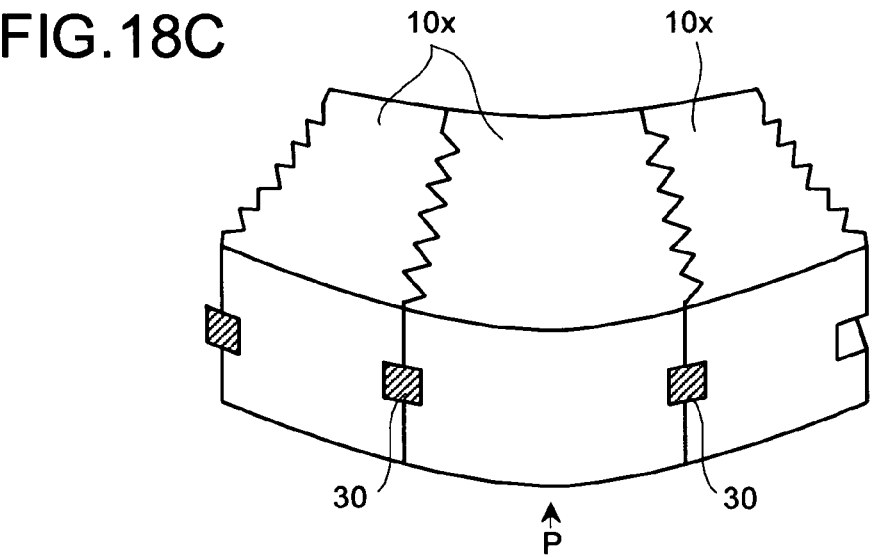
FIG. 18C is an explanatory view of an example of combining the first shock absorber blocks by forming an antiskid portion in each first shock absorber block itself.

FIGS. 18A to 18C are explanatory views of an example of combining the first shock absorber blocks by forming an antiskid portion in each first shock absorber block itself. This first shock absorber block 10x is configured so that convex portions 33t and concave portions 33v are alternately formed on both sides. The convex portions 33t and the concave portions 33v are formed to be orthogonal to an input direction of the shock load P. At the time of combining a plurality of first shock absorber blocks 10x, the convex portions 33t of one first shock absorber blocks 10x are engaged with the concave portions 33v of the adjacent block, thereby preventing the first shock absorber blocks 10x from being shifted relative to one another. At this time, as shown in FIG. 18C, an antiskid member 30 is incorporated into a groove formed in each first shock absorber block 10x. In addition, it is preferable to suppress the first shock absorber blocks 10x from being shifted relative to a formation direction of the convex portions 33t and the concave portions 33v.

Figure 19A:
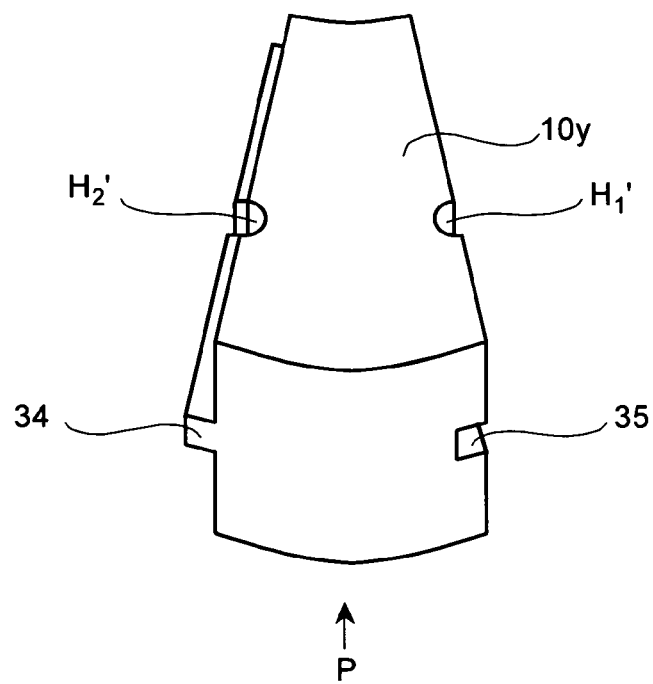
FIG. 19A is an explanatory view of another example of combining the first shock absorber blocks by forming an antiskid portion in each first shock absorber block itself.
Figure 19B:
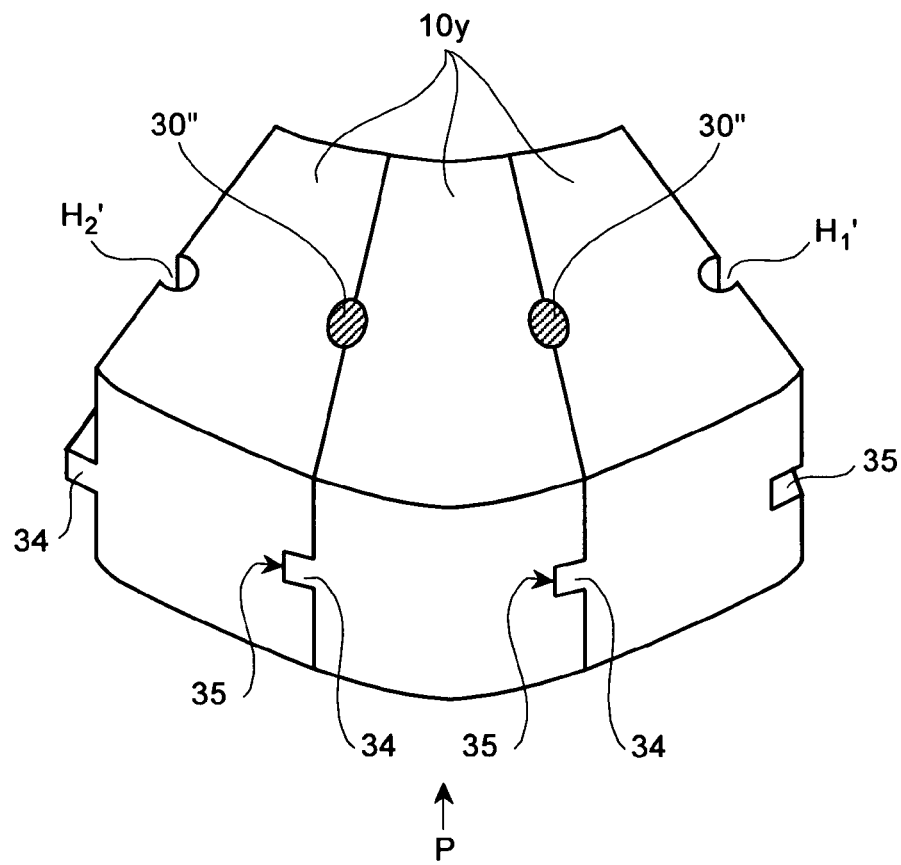
FIG. 19B is an explanatory view of another example of combining the first shock absorber blocks by forming an antiskid portion in each first shock absorber block itself.

FIGS. 19A and 19B are explanatory views of another example of combining the first shock absorber blocks by forming an antiskid portion in each first shock absorber block itself. This first shock absorber block 10y is configured so that a protrusion 34 is formed on one side surface of the first shock absorber block 10y and so that a groove 35 to be engaged with the protrusion 34 is formed on an opposing side surface thereof. The protrusion 34 and the groove 35 are formed in parallel to each other in the input direction of the shock load P. At the time of combining a plurality of first shock absorber blocks 10y, the protrusion 34 of one first shock absorber block 10y is engaged with the groove 35 of the adjacent first shock absorber block 10y, thereby preventing the first shock absorber blocks 10y from being shifted relative to one another. At this time, it is preferable that grooves $H_1'$ and $H_2'$ are formed in a direction crossing a formation direction of the protrusion 34 and the groove 35, and antiskid members 30'' are incorporated into the respective grooves $H_1'$ and $H_2'$ so as to suppress the first shock absorber blocks 10y from being shifted relative to the formation directions of the protrusion 34 and the groove 35.

Figure 20A:
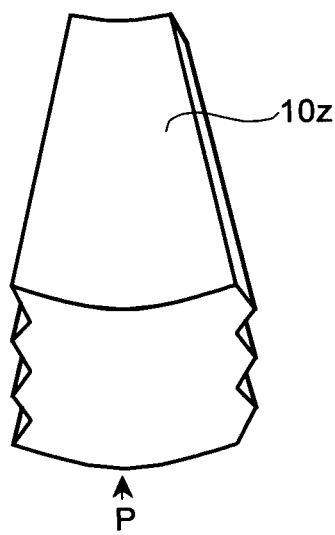
FIG. 20A is an explanatory view of another example of combining the first shock absorber blocks by forming an antiskid portion in each first shock absorber block itself.
Figure 20B:
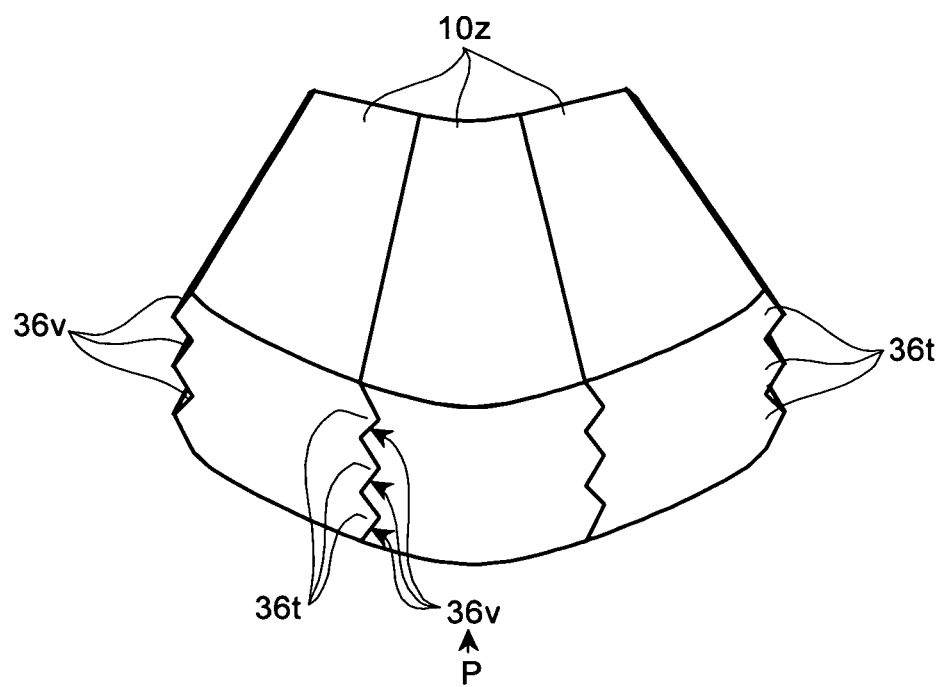
FIG. 20B is an explanatory view of another example of combining the first shock absorber blocks by forming an antiskid portion in each first shock absorber block itself.
Figure 20C:
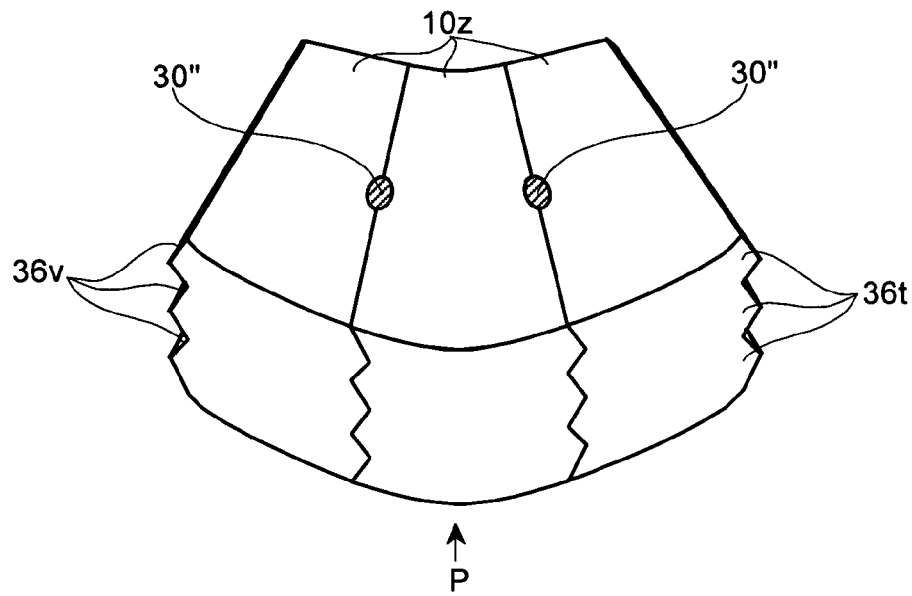
FIG. 20C is an explanatory view of another example of combining the first shock absorber blocks by forming an antiskid portion in each first shock absorber block itself.

FIGS. 20A to 20C are explanatory views of another example of combining the first shock absorber blocks by forming the antiskid portion in each first shock absorber block itself. This first shock absorber block 10z is configured so that convex portions 36t are formed on one side surface of the first shock absorber block 10z and so that concave portions 36v to be engaged with the convex portions 36t are formed on an opposing side surface thereof. The convex portion 36t and the concave portion 36v are formed in parallel to the input direction of the shock load P. At the time of combining a plurality of first shock absorber blocks 10z, the convex portions 36t of one first shock absorber block 10z are engaged with the concave portions 36v of the adjacent first shock absorber block 10z, thereby preventing the first shock absorber blocks 10z from being shifted. At this time, as shown in FIG. 20C, it is preferable to form grooves in a direction crossing the formation direction of the convex portion 36t and the concave portion 36v, and incorporate the antiskid members 30'' into the grooves so as to suppress the first shock absorber blocks 10z from being shifted relative to the formation direction of the protrusion 34 and the groove 35.

Figure 21:
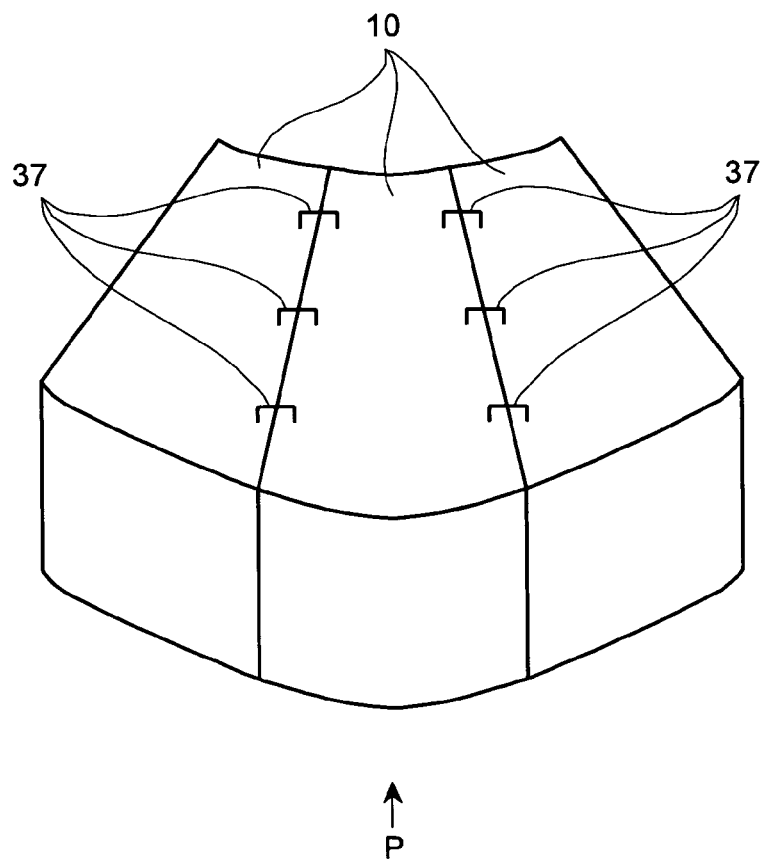
FIG. 21 is an explanatory view of another example of combining the first shock absorber blocks using fixing members.

FIG. 21 is an explanatory view of another example of combining the first shock absorber blocks using fixing members. In this block combination structure, after the first shock absorber blocks 10 are combined, the blocks 10 are fixed to one another using inverted U-shaped screws 37 serving as the fixing members. This block combination structure can prevent the first shock absorber blocks from being shifted relative to one another by a simple configuration.

Figure 22A:
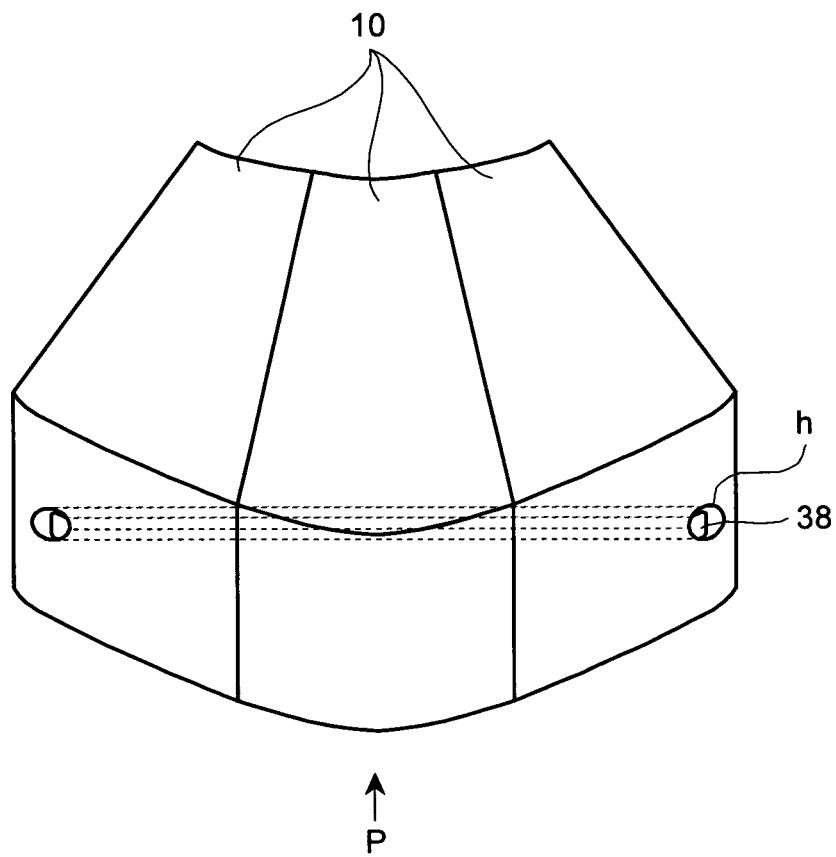
FIG. 22A is an explanatory view of a block combination structure using a block fastening unit.
Figure 22B:
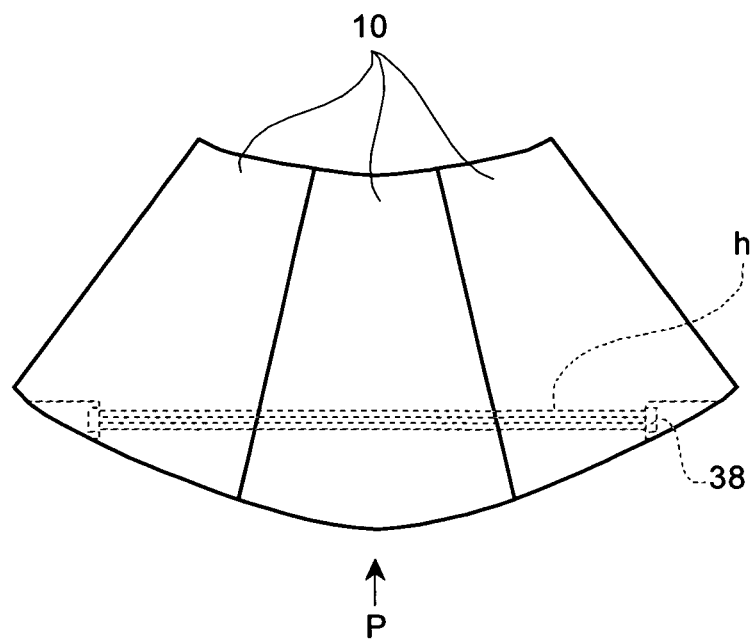
FIG. 22B is an explanatory view of the block combination structure using the block fastening unit.

FIGS. 22A and 22B are explanatory views of a block combination structure using a block fastening unit. In this block combination structure, a through hole h that penetrates a plurality of (three in this example) first shock absorber blocks 10 is provided. After a plurality of first shock absorber blocks 10 are combined, a bolt 38 serving as the fastening unit is inserted into this through hole h, thereby fixing the first shock absorber blocks 10 to one another. This structure can firmly fix the first shock absorber blocks 10 to one another by the fastening unit. If a strength of the bolt 38 serving as the fastening unit is too high, there is a probability that a deformation of the central first shock absorber block 10 is received by the first shock absorber blocks 10 on both sides thereof, and that the central first shock absorber block 10 is insufficiently crashed. For this reason, it is preferable to avoid using an excessively thick bolt or to use a bolt consisting of an easily deformable material if the bolt is used as the fastening unit. In addition, it is preferable to suppress crashing of the central first shock absorber block 10 using, for example, a fastening unit having an adjustable joint structure or a fastening unit, e.g., a wire having a structure in which the fastening unit is bent halfway.

Figure 23A:
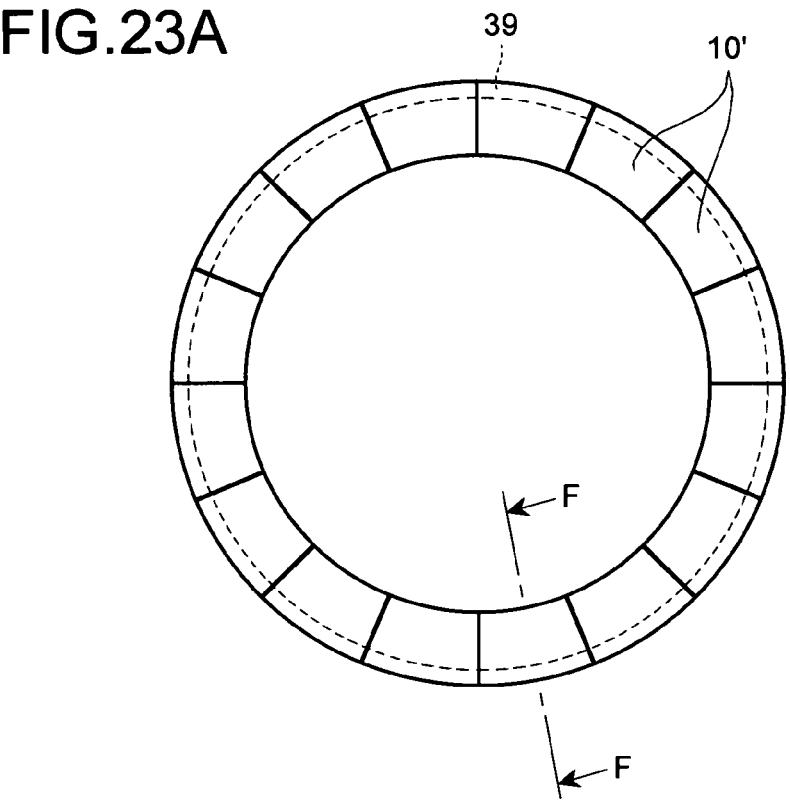
FIG. 23A is an explanatory view of a block combination structure using a block binding unit.
Figure 23B:
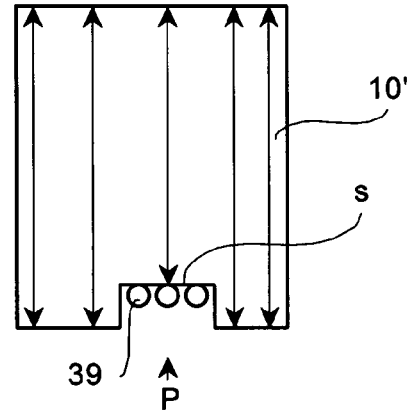
FIG. 23B is a cross-section taken along a line F-F of FIG. 23A.
Figure 23C:
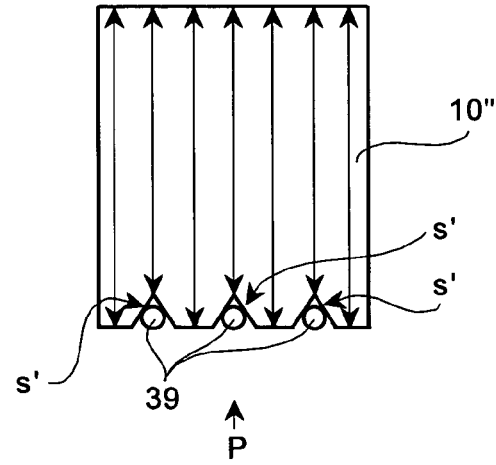
FIG. 23C is a cross-section taken along the line F-F of FIG. 23A according to another example.

FIG. 23A is an explanatory view of a block combination structure using a block binding unit. FIG. 23B is a cross-section taken along a line F-F of FIG. 23A. FIG. 23C is another cross-section taken along the line F-F of FIG. 23A. In this block combination structure, a groove s is formed on an outer periphery of a first shock absorber block 10'. After the first shock absorber B1 is formed by annularly combining a plurality of first shock absorber blocks 10', a wire 39 serving as the block binding unit is wound entirely around the first shock absorber B1, thereby constraining and fixing the respective first shock absorber blocks 10'. This structure can firmly fix the respective first shock absorber blocks 10' by a tensile force of the wire 39.

The groove s corresponds to the "space" provided in the first shock absorber block 10' as explained in the first embodiment. As can be seen, in this block combination structure, the space is formed in each first shock absorber block 10' by the groove s. It is thereby possible to generate cracking and crashing in sheared parts of the first shock absorber block 10' with the groove s set as a point of origin, and accelerate absorption of the shock energy by the first shock absorber block 10'. At this moment, if a magnitude and a shape of the groove s are changed, a speed of cracking or crashing of the sheared parts of the first shock absorber block 10' can be adjusted. Furthermore, as seen in a first shock absorber block 10'' shown in FIG. 23C, wedge grooves s' can be formed by cross sections corresponding to "spaces" and the wire 39 can be wound around the grooves s'. By doing so, it is possible to suppress the wire 39 from being shifted and adjust a strength and a rigidity of the first shock absorber block 10''. Further, an apparent cross-sectional area of the first shock absorber block 10'' can be reduced and an initial stress generated when the shock load P acts on the block 10'' can be reduced. Besides, cracking and crashing can be generated in sheared parts of the first shock absorber block 10'' with tops of the grooves s' set as points of origin, and absorption of the shock energy by the first shock absorber block 10'' can be accelerated.

FIGS. 24A to 24D are explanatory views of an example of a combination structure of the first shock absorber blocks. FIG. 25A is an explanatory view of a stress change when the combination structure, in which first shock absorber blocks each having a larger area on a diametral outside are combined, receives the shock load. FIG. 25B is an explanatory view of a stress change when a combination structure, in which first shock absorber blocks each having a smaller area on a diametral outside and the first shock absorber blocks each having a larger area on a diametral outside are combined, receives the shock load.

As explained above, the first shock absorber block constituting the first shock absorber B1 (see FIG. 7) is made of the first material having the highest compressive strength. If the wood material is used, oak, for example, is used as the first material. Since the oak has a high compressive strength, lockup tends to occur when the buffer body is deformed to crash the first shock absorber blocks. For instance, the first shock absorber block 10C shown in FIG. 25A is generally fan-shaped and an area of a diametral outside O is larger than that of a diametral inside I. In the structure in which the first shock absorber blocks 10C thus shaped are made of the material having the high compressive strength such as oak and combined, a reaction force F within the first shock absorber block 10C suddenly rises at a certain strain ($\epsilon c$) by the lockup when the shock load P is applied to the block 10C. As a result, after occurrence of the lockup, the shock load can possibly be absorbed insufficiently.

Figure 24A:
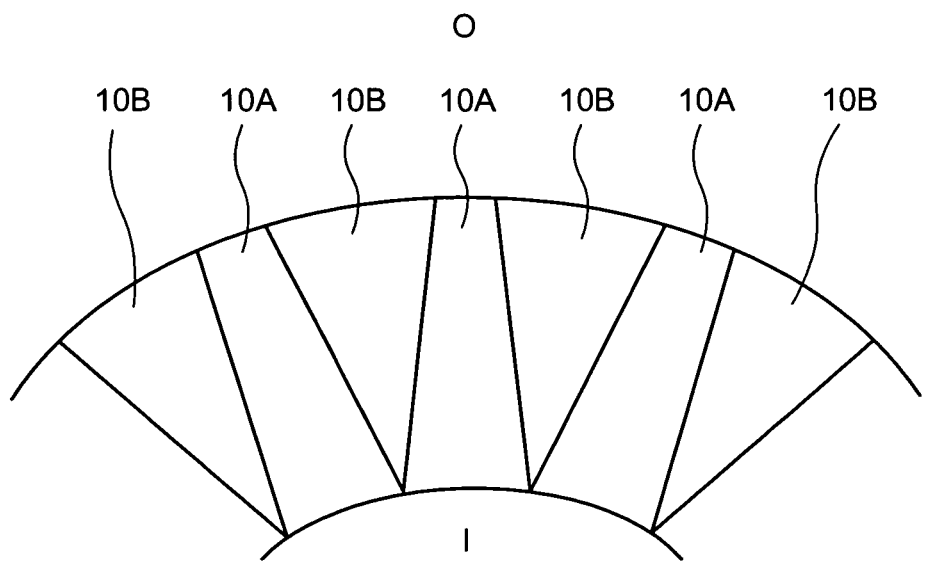
FIG. 24A is an explanatory view of an example of a combination structure of the first shock absorber blocks.
Figure 24B:
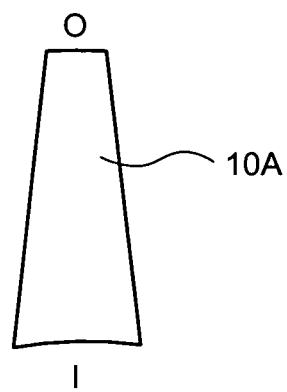
FIG. 24B is an explanatory view of an example of a combination structure of the first shock absorber blocks.
Figure 24C:
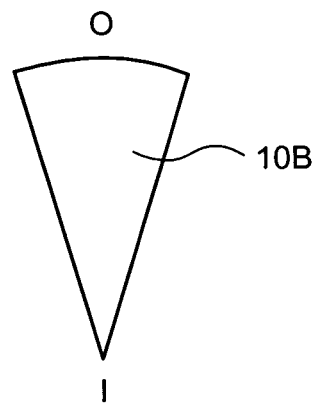
FIG. 24C is an explanatory view of an example of a combination structure of the first shock absorber blocks.
Figure 25A:
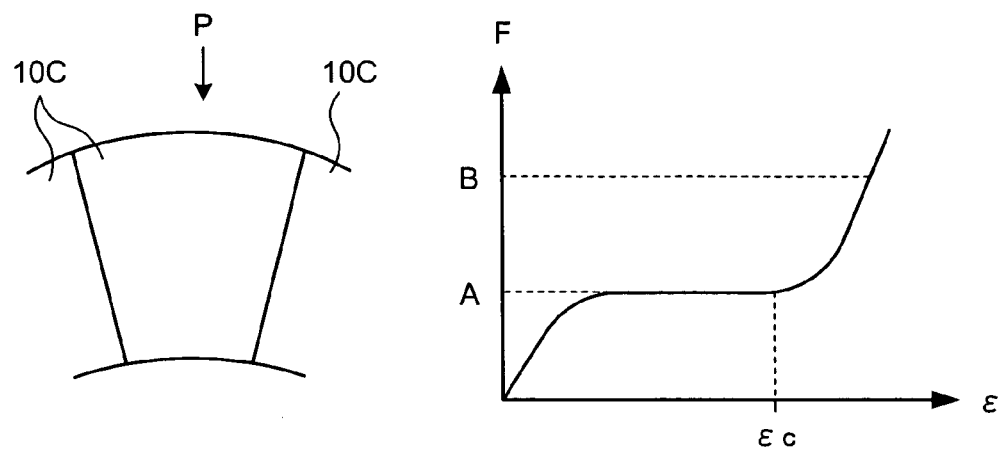
FIG. 25A is an explanatory view of a stress change when the combination structure, in which first shock absorber blocks each having a larger area on a diametral outside are combined, receives a shock load.
Figure 25B:
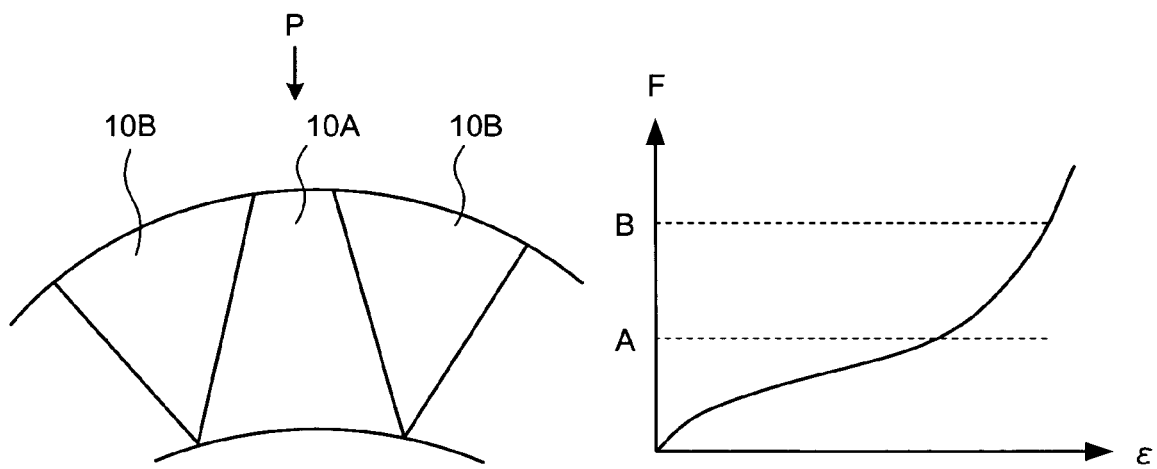
FIG. 25B is an explanatory view of a stress change when the combination structure, in which first shock absorber blocks each having a smaller area on a diametral outside and the first shock absorber blocks each having a larger area on a diametral outside are combined, receives a shock load.

In this combination structure of the first shock absorber blocks, a shock absorber block A (hereinafter, "first shock absorber block 10A") having a larger area on the diametral inside I than on the diametral outside O is constituted by a material having a high compressive strength such as oak (FIGS. 24A and 24B). A shock absorber block B (hereinafter, "first shock absorber block 10B") having a larger area on the diametral outside O than on the diametral inside I is constituted by a material lower in compressive strength than the material for the first shock absorber block 10A (FIGS. 24A and 24C). At this time, by making the acting direction of the load substantially parallel to the fiber direction, a rigidity of the first shock absorber block 10A is made high in the acting direction of the load. By making the acting direction of the load substantially orthogonal to the fiber direction, a rigidity of the first shock absorber block 10B is made low in the acting direction of the load and high in the peripheral direction. By so setting, if the shock load P is applied to the first shock absorber blocks 10A, it is possible to suppress the first shock absorber blocks 10A from falling laterally (suppress a motion thereof toward the peripheral direction of the combination structure of the first shock absorber blocks). If oak is used as the material for the first shock absorber block 10A, such a material as oak, red cedar, pine, or spruce is used for the first shock absorber block 10B. The notches shown in FIG. 15I or the like can be provided on a surface of each shock absorber block B (first shock absorber block 10B).

Figure 24D:
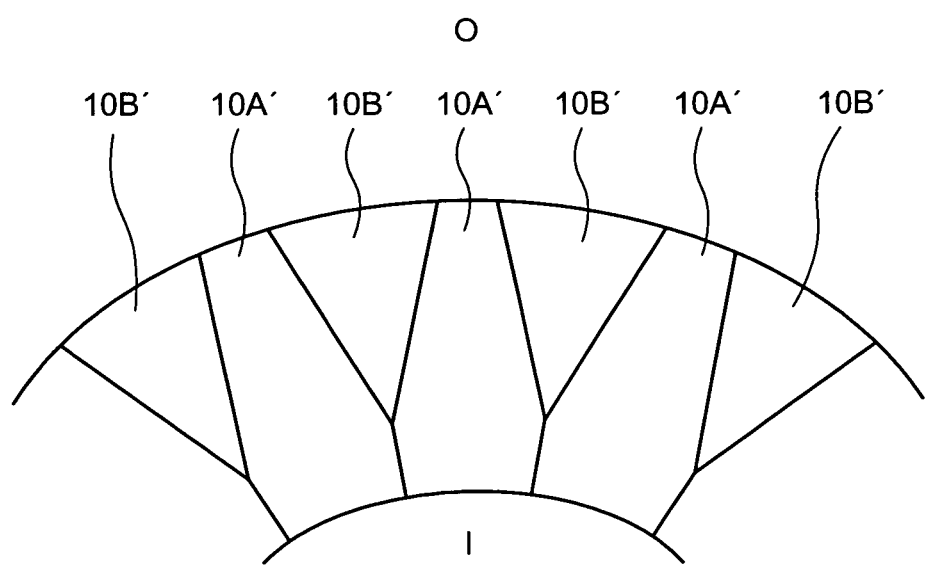
FIG. 24D is an explanatory view of an example of a combination structure of the first shock absorber blocks.

In the combination structure of the first shock absorber blocks shown in FIG. 24D, the shock absorber block A (hereinafter, "first shock absorber block 10A'") having a larger area on the diametral inside I than on the diametral outside O is constituted by a material having a high compressive strength such as oak (FIG. 24D). A shock absorber block B (hereinafter, "first shock absorber block 10B'") having a larger area on the diametral outside O than on the diametral inside I is constituted by a material lower in compressive strength than the material for the first shock absorber block 10A' (FIG. 24D). Furthermore, each first shock absorber block 10A' contacts with the first shock absorber block 10B' by a predetermined area on the diametral inside I of the first shock absorber B1 (see FIG. 7). As can be seen, the first shock absorber blocks 10A' and 10B' can contact with each other by the predetermined area on the diametral inside I of the first shock absorber B1 depending on hardness of the materials and the performances required of the buffer body as shown in FIG. 24D.

If the shock load P is applied to such a combination structure of the first shock absorber blocks (see FIG. 25B), the reaction force F within the first shock absorber block 10A gradually increases according to an increase of the strain $\epsilon$. In addition, occurrence of the lockup can be delayed. As a result, the shock load can be effectively absorbed. During the falling or collision of the cask 1, therefore, the cask 1 can be ensured to be protected. In this combination structure of the first shock absorber blocks, the spaces for dividing the fibers of the wood material, the slots parallel to the fibers of the wood material, or the like can be provided in each of the first shock absorber blocks 10A and 10B as explained in the first embodiment. However, even if the spaces, slots or the like are not provided therein, the stress within the shock absorber block can be gradually increased and the occurrence of the lockup can be delayed. The shock load can be, therefore, effectively absorbed.

According to the second embodiment, it is possible to suppress the shock absorbers from being shifted relative to one another by providing the antiskid member or the like on each shock absorber block. This can facilitate operations for assembling the shock absorber blocks and manufacturing the shock absorber. Furthermore, since the shifting of the shock absorber blocks constituting the shock absorber is suppressed, the buffer body can exhibit the required shock absorbing performance when the shock due to the falling or collision acts on the buffer body.

INDUSTRIAL APPLICABILITY

As explained so far, the cask buffer body according to the present invention is useful for protection of the cask that stores the recycle fuel and particularly suitable for stably exhibiting the shock absorbing performance.

The invention claimed is:
1. A cask buffer body comprising:
a shock absorber including a wood material, the shock absorber configured to be attached to a cask that stores a recycle fuel and configured having line-shaped sides and circular arc-shaped corners surrounding a periphery of the cask, the shock absorber absorbing a shock against the cask by being deformed, the shock absorber including a plurality of empty holes for adjusting a shock absorbing capability, the shock absorber comprising:
a first shock absorber group including:
    a first shock absorber configured to absorb a shock generated by the horizontal falling or collision of the cask;
a second a shock absorber group configured to absorb the shock when the cask vertically falls or collides or obliquely falls or collides, the second shock absorber group including:
    a second shock absorber;
    a third shock absorber; and
    a fourth shock absorber; and
a third shock absorber group configured to absorb the shock when the cask vertically falls or collides, the third shock absorber group configured to sufficiently relax a shock force transmitted to a primary lid and a secondary lid of the cask, the third shock absorber group including:
    a fifth shock absorber;
    a sixth shock absorber;
    a seventh shock absorber; and
    an eighth shock absorber, wherein the first shock absorber is made of a first material having a highest compressive strength among all of the first to the eighth shock absorbers, wherein the second to the fourth shock absorbers are made of a second material lower in compressive strength than the first shock absorber, wherein the fifth to the eighth shock absorbers are made of a third material lower in compressive strength than the second to the fourth shock absorbers, wherein the first to the eighth shock absorbers are arranged by changing directions of fibers of the wood materials, wherein the compressive strength is a Young's modulus or a compression strength when the shock absorber is compressed.

2. The cask buffer body according to claim 1, wherein
the first material is oak;
the second material is red cedar; and
the third material is balsa.

\* \* \* \* \*

UNITED STATES PATENT AND TRADEMARK OFFICE
CERTIFICATE OF CORRECTION

PATENT NO. : 8,731,129 B2  Page 1 of 1
APPLICATION NO. : 10/569226
DATED : May 20, 2014
INVENTOR(S) : Tamaki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1324 days.

Signed and Sealed this

Twenty-ninth Day of September, 2015

Michelle K. Lee
*Director of the United States Patent and Trademark Office*